J. D. PEDERSEN.
MAGAZINE FIREARM.
APPLICATION FILED JUNE 6, 1916. RENEWED AUG. 9, 1917.
1,317,988.
Patented Oct. 7, 1919.
14 SHEETS—SHEET 1.
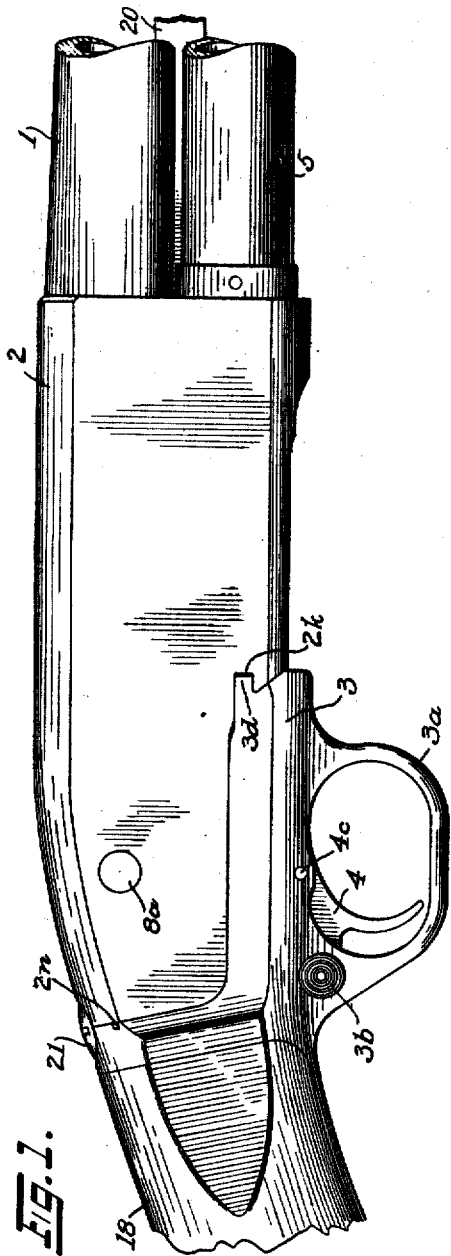
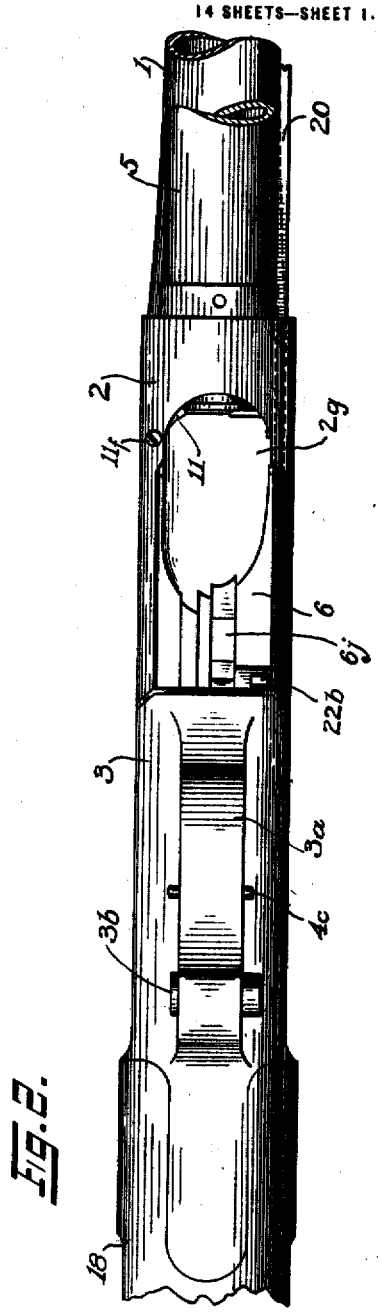
Inventor:
John D. Pedersen.
By F. H. Richards,
his Atty.

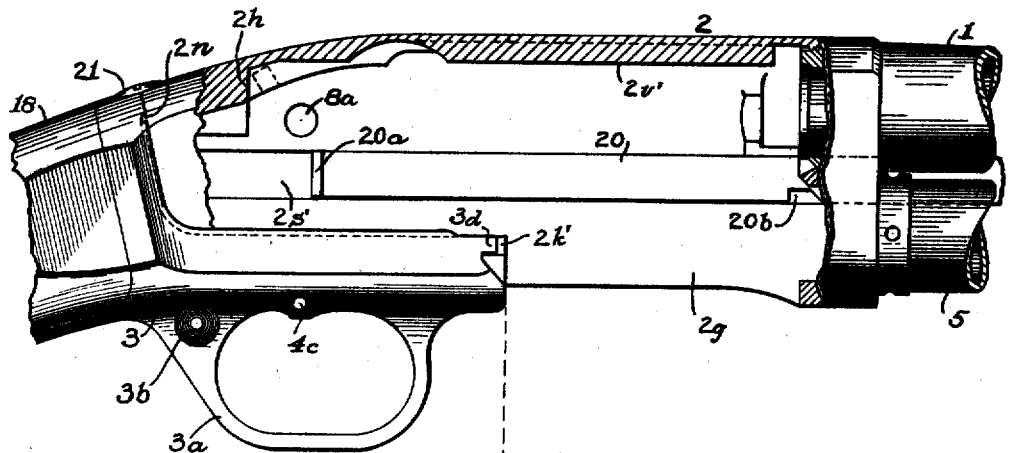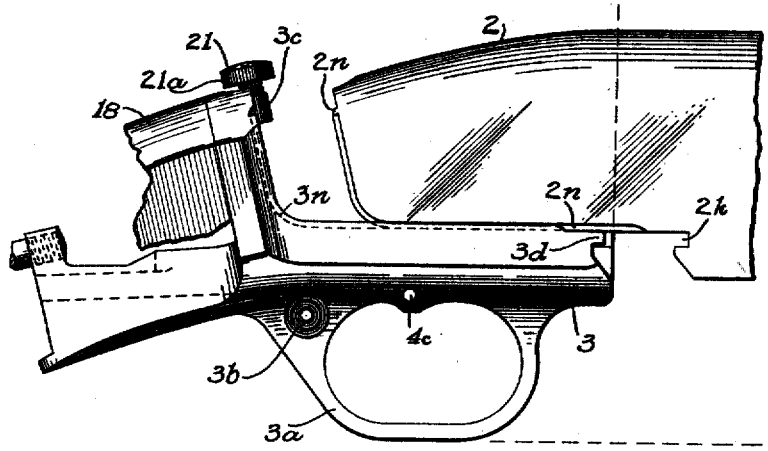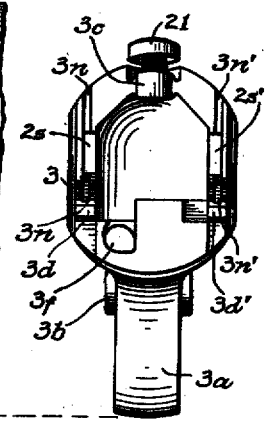

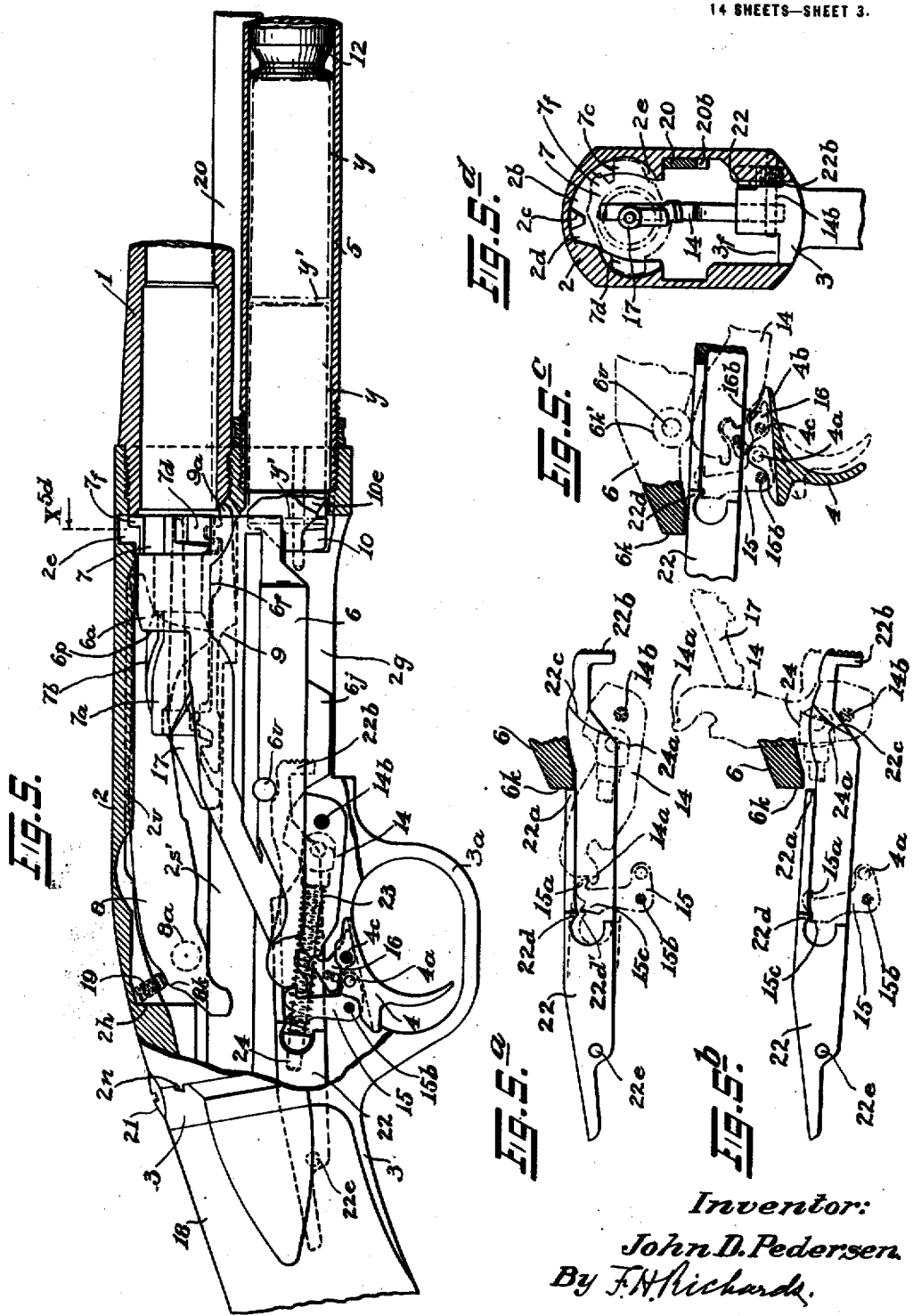

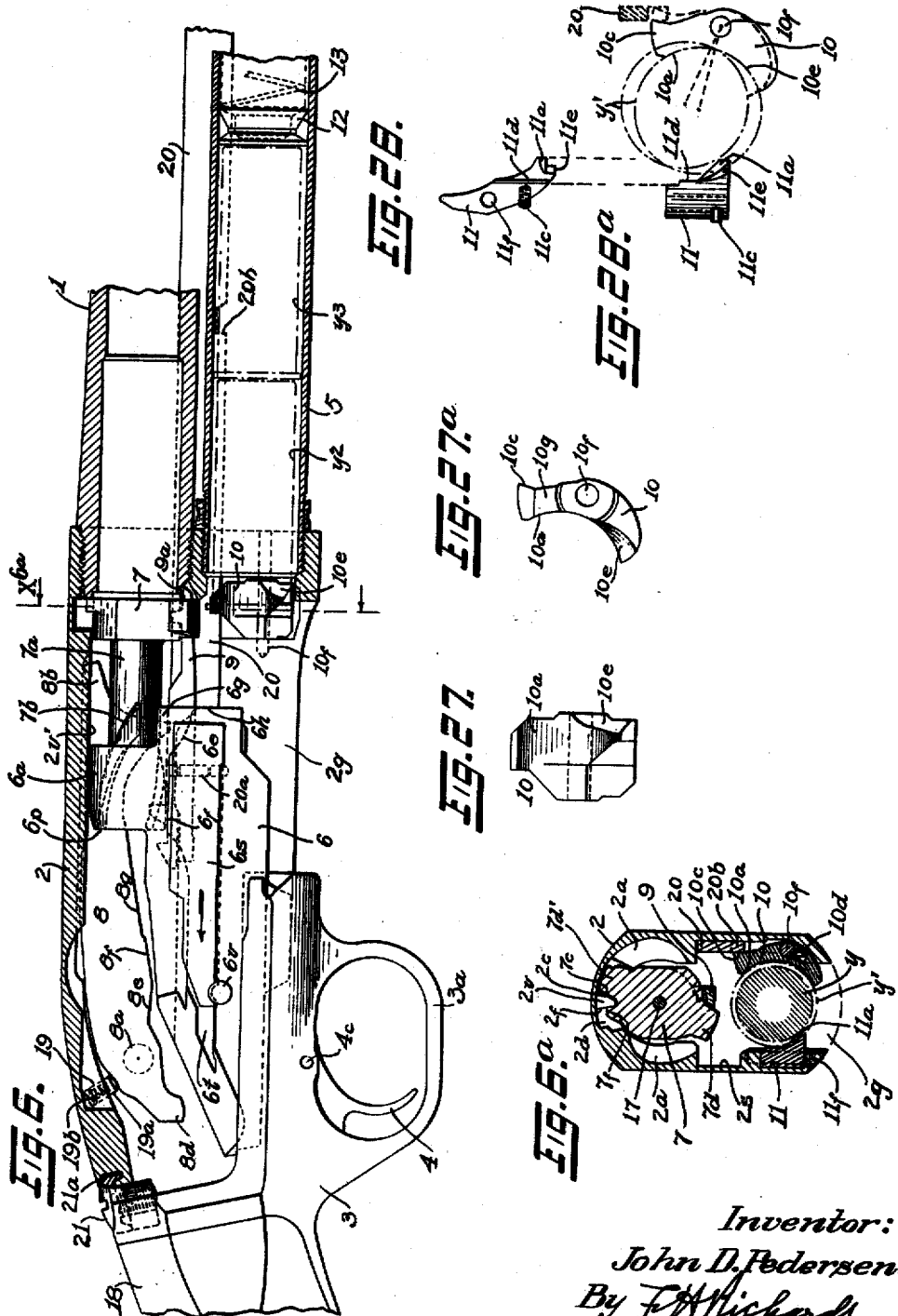

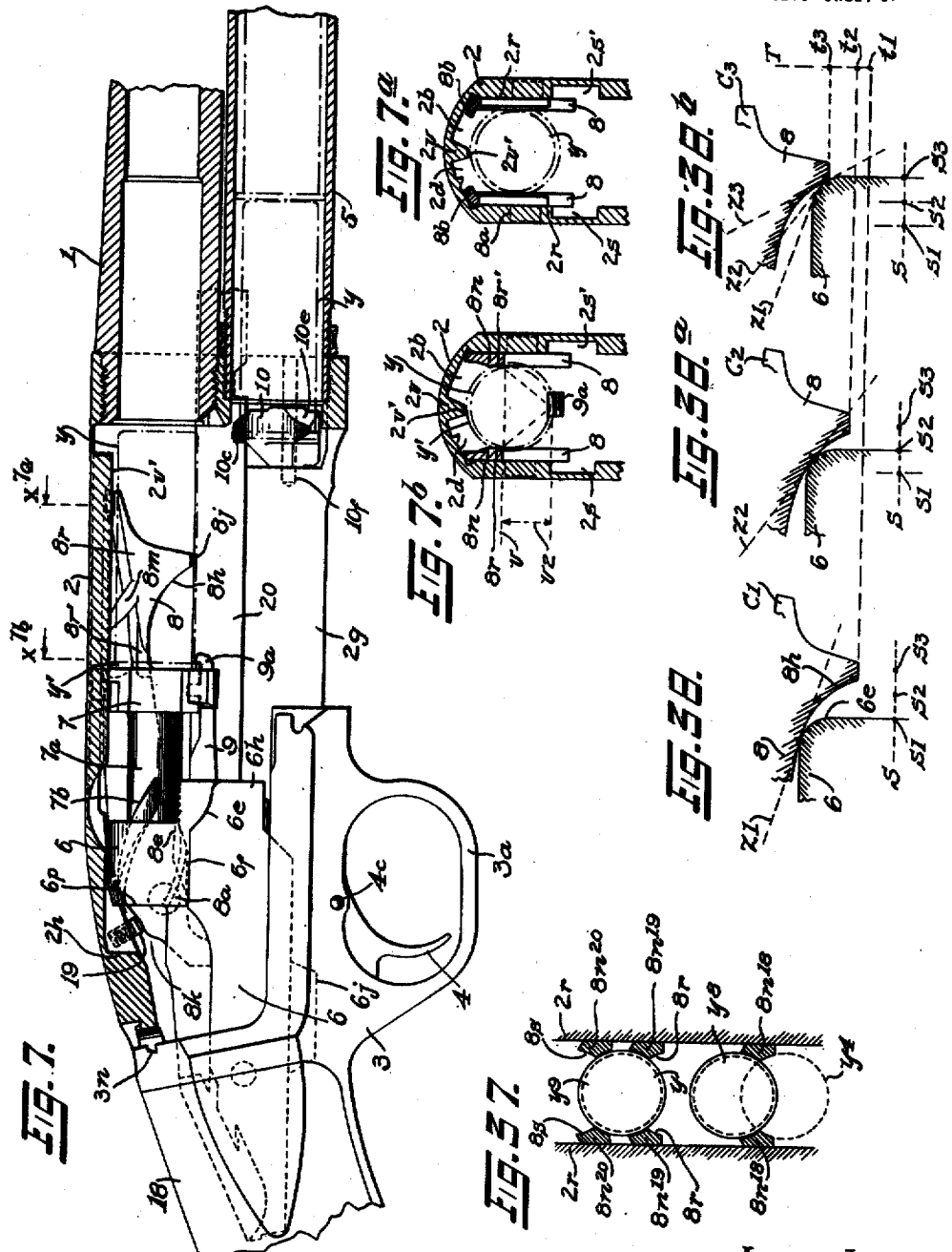

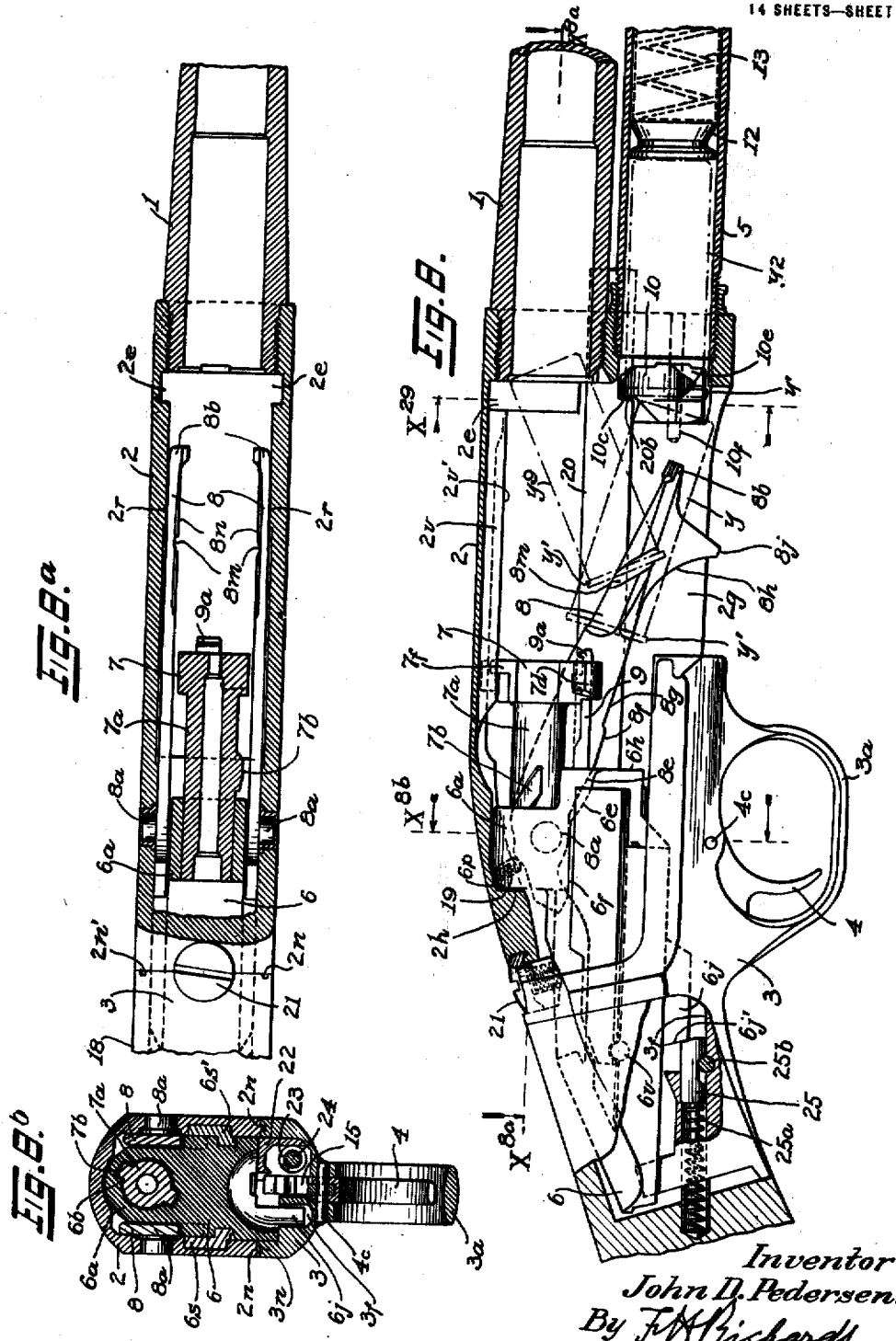

J. D. PEDERSEN.
MAGAZINE FIREARM.
APPLICATION FILED JUNE 6, 1916. RENEWED AUG. 9, 1917.
1,317,988.
Patented Oct. 7, 1919.
14 SHEETS—SHEET 7.
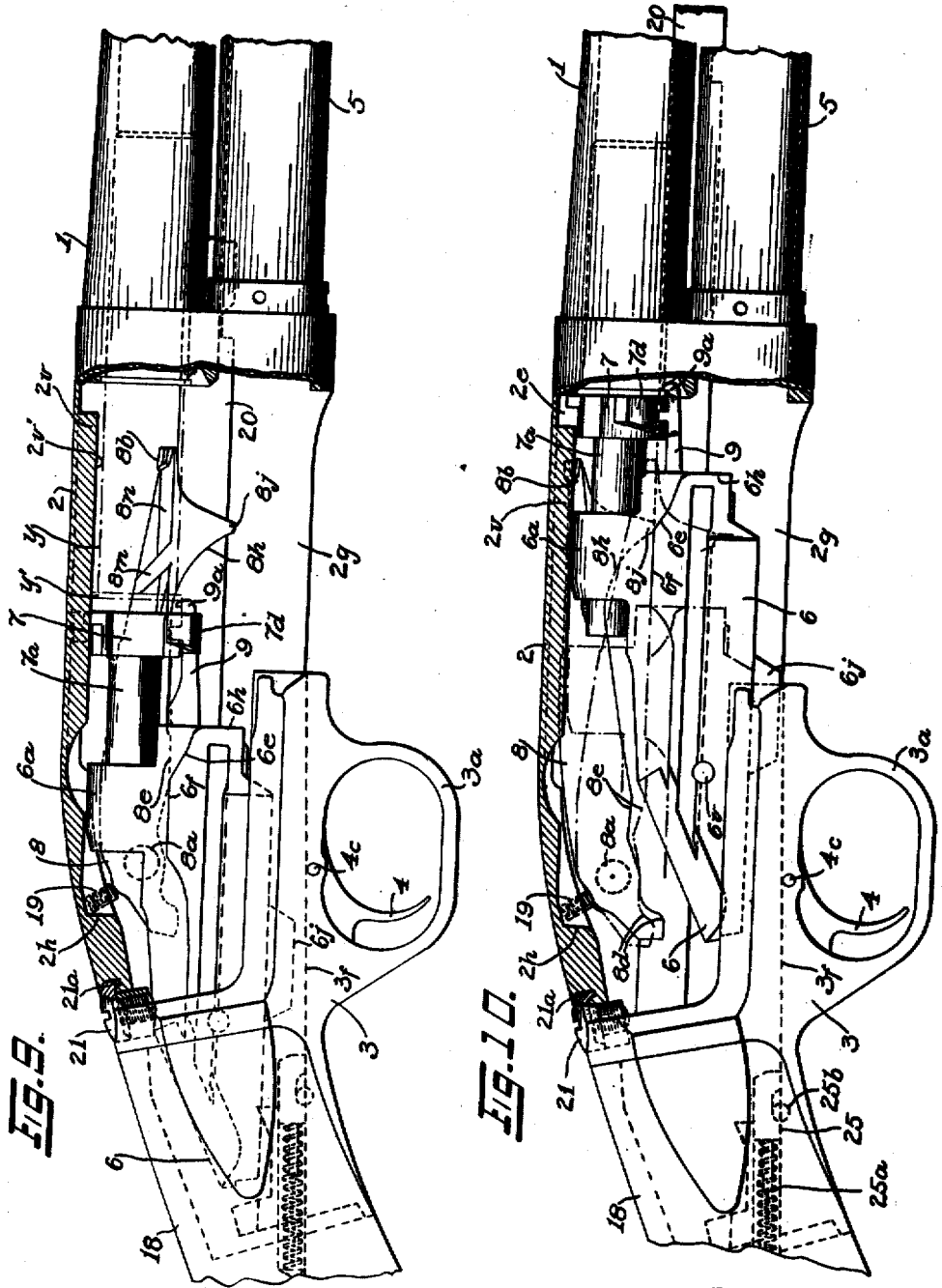
Inventor:
John D. Pedersen.
by F. H. Richards.
his Atty.

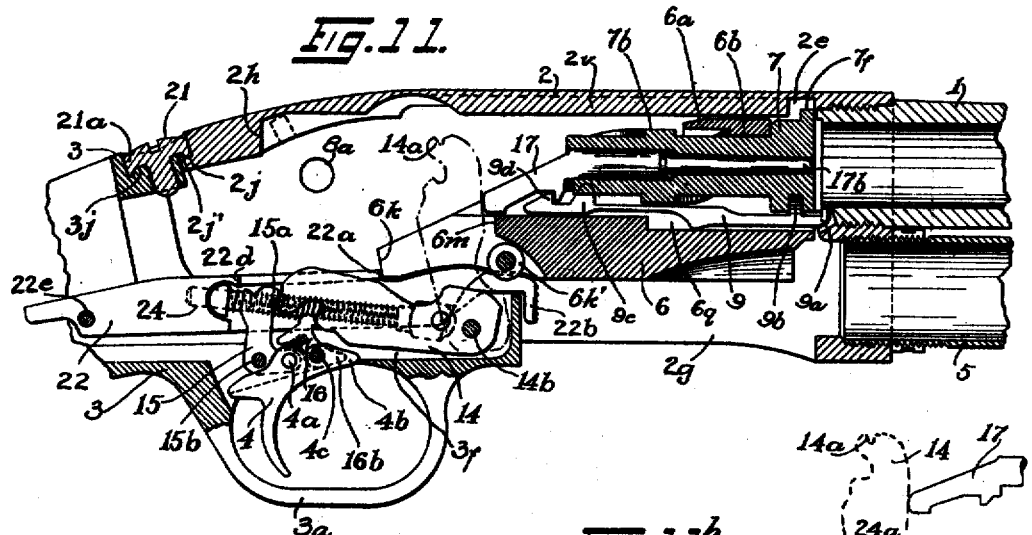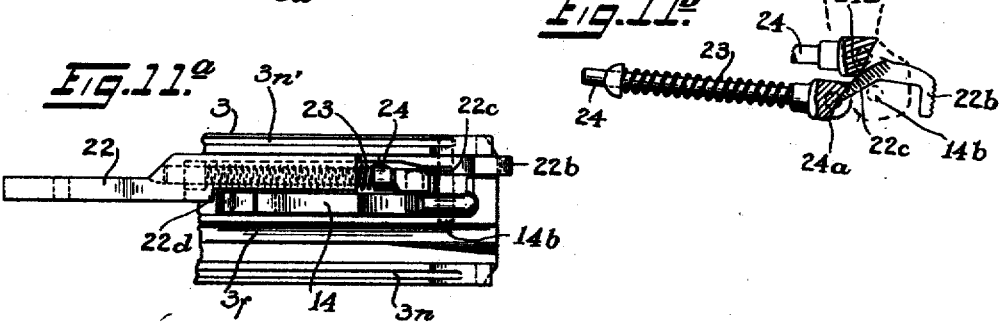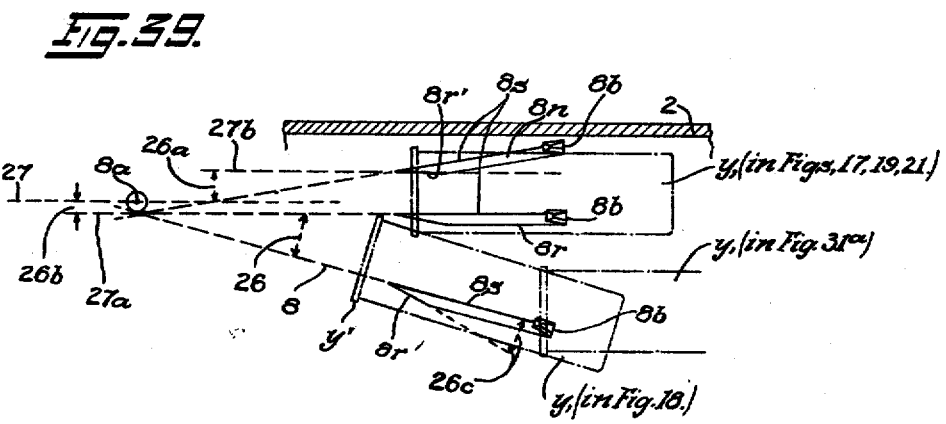

J. D. PEDERSEN.
MAGAZINE FIREARM.
APPLICATION FILED JUNE 6, 1916. RENEWED AUG. 9, 1917.
1,317,988.
Patented Oct. 7, 1919.
14 SHEETS—SHEET 8.
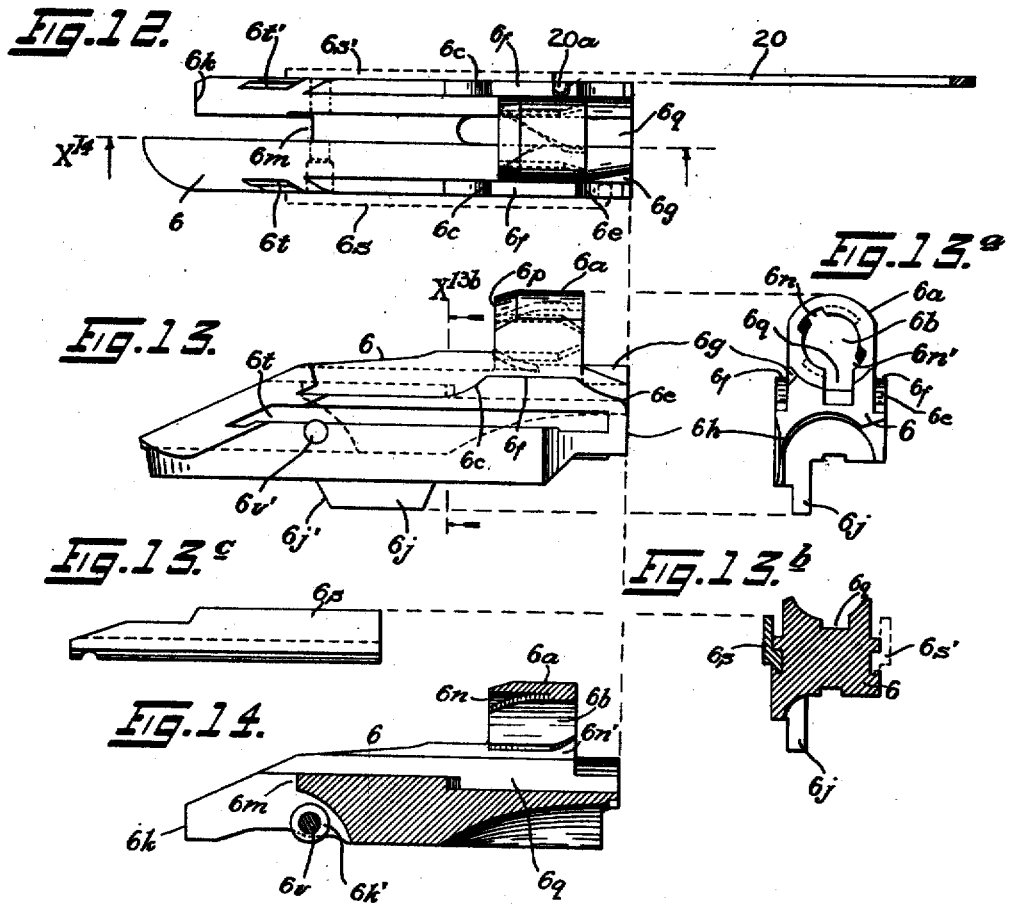
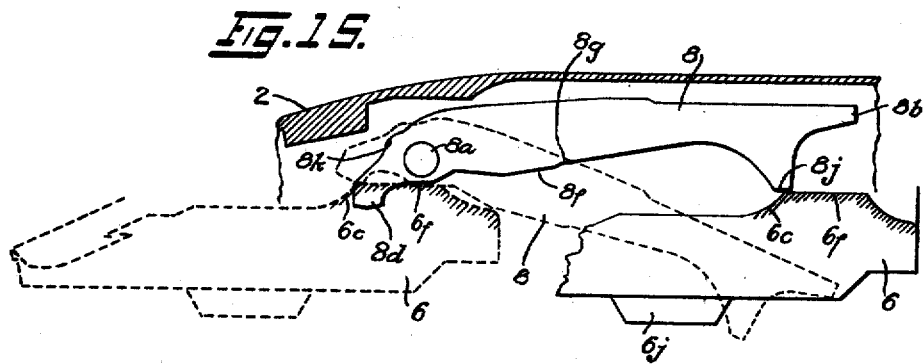
Inventor:
John D. Pedersen,
By F. H. Richards,
his Att'y.

J. D. PEDERSEN.
MAGAZINE FIREARM.
APPLICATION FILED JUNE 6, 1916. RENEWED AUG. 9, 1917.
1,317,988.
Patented Oct. 7, 1919.
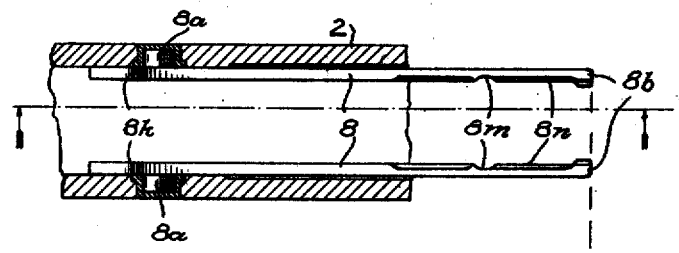
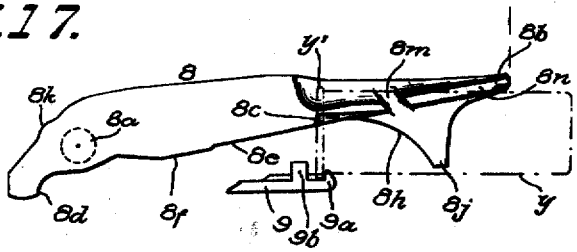
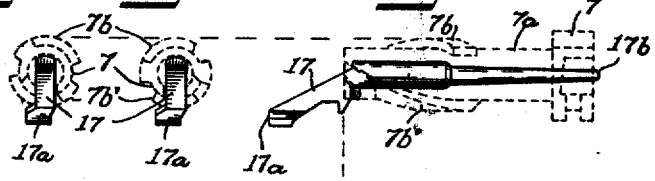
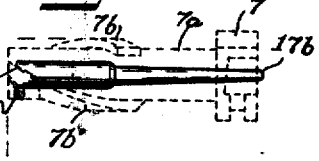
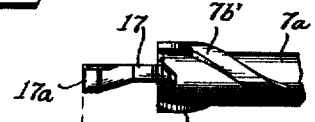
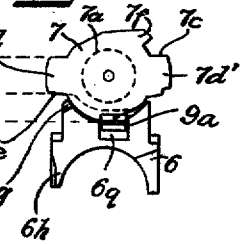
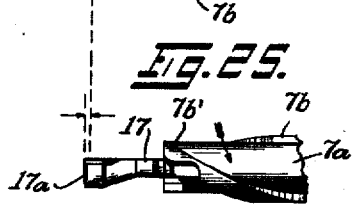
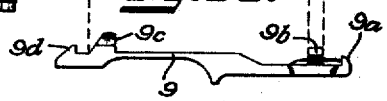
Inventor:
John D. Pedersen.
By F. H. Richards,
his Att'y.

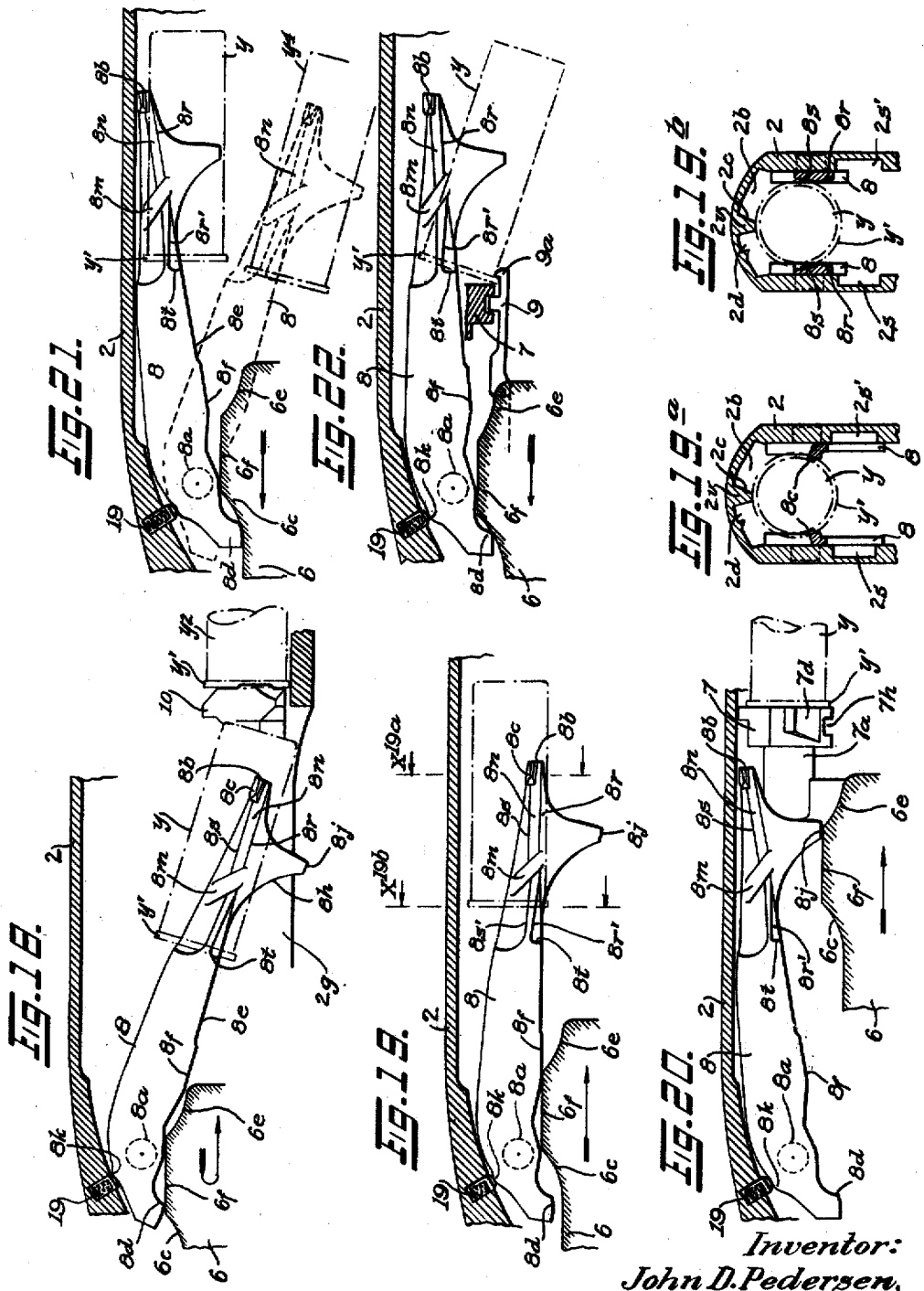

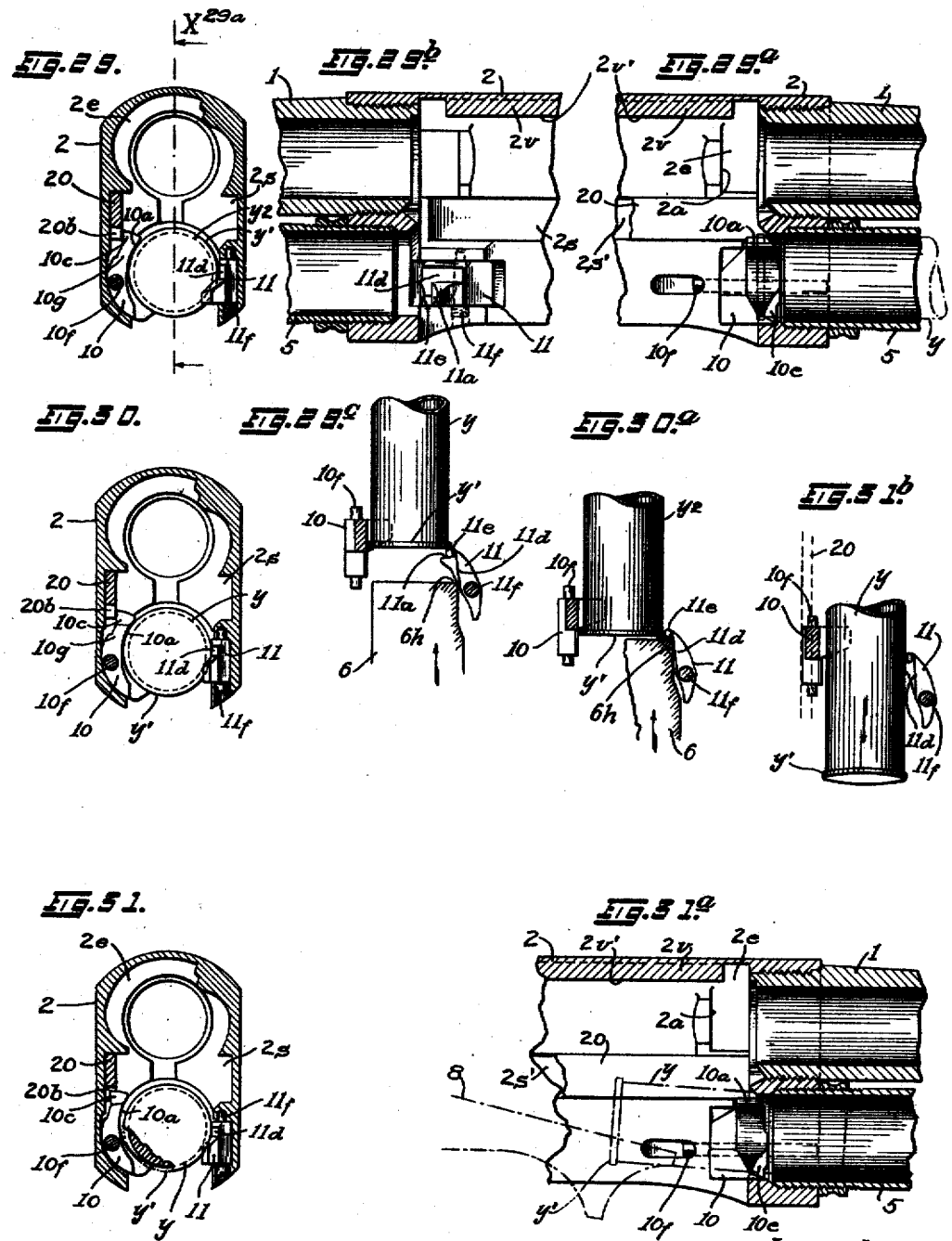

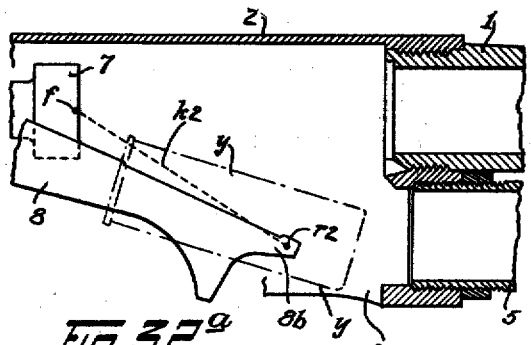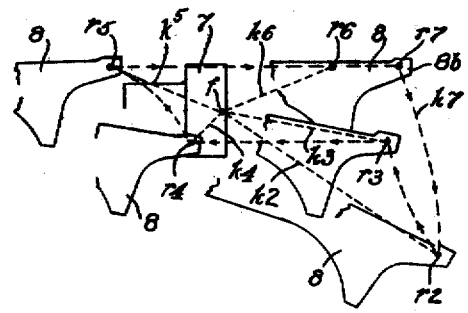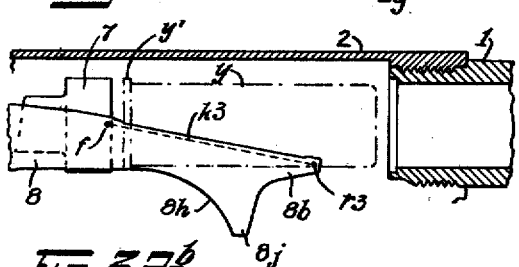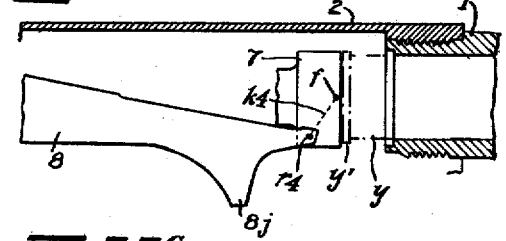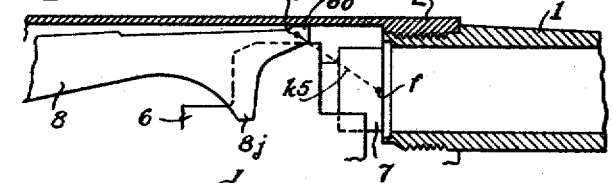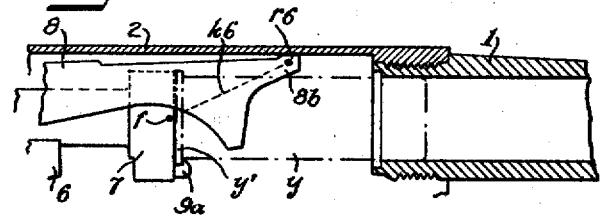

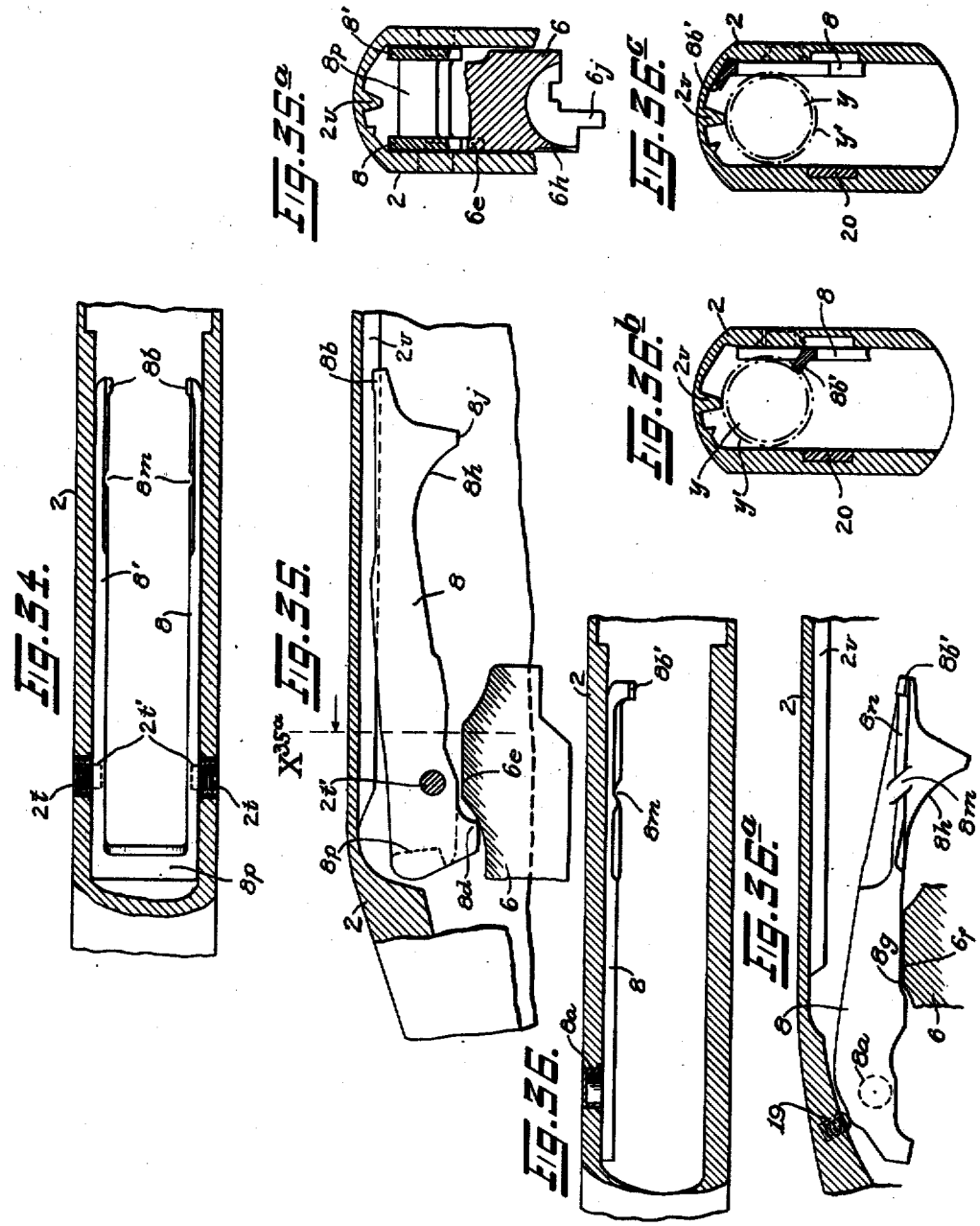

UNITED STATES PATENT OFFICE.

JOHN D. PEDERSEN, OF JACKSON, WYOMING.

MAGAZINE-FIREARM.

1,317,988.   Specification of Letters Patent.   Patented Oct. 7, 1919.

Application filed June 6, 1916, Serial No. 101,931. Renewed August 9, 1917. Serial No. 185,394.

*To all whom it may concern:*

Be it known that I, JOHN D. PEDERSEN, a citizen of the United States, residing in Jackson, in the county of Lincoln and State of Wyoming, have invented certain new and useful Improvements in Magazine-Firearms, of which the following is a specification.

This invention relates more especially to that class of magazine firearms which are distinguished by the "bottom-ejection" of the cartridge shells from a receiver chamber otherwise closed. A principal object of my present invention is to furnish an improved organization of a reciprocatable breech action combined with a carrier and ejector whereby the usual loading, firing and shell-extracting operations may be reliably performed, and whereby the shells, after firing, may be positively discharged by the bottom-ejection method, regardless of the position of the arm.

My present invention is in part in the nature of an improvement in the firearm described in Letters Patent No. 719,955, granted to me February 3, 1903, in which the firearm is arranged for "bottom-ejection" and is provided with a pivotally-supported cartridge-carrier arranged for a stroke between a cartridge-receiving position below the magazine and a loading-in position. In that firearm mechanism, however, the axis on which the carrier oscillates, is located in a direction longitudinally of the receiver and barrel, while I have herein shown a combined carrier and ejector having the axis thereof located transverse to the receiver; the carrier is also herein arranged for a further upward stroke to a shell-receiving position which is on a side of the barrel entrance opposite to the magazine.

Bottom ejection, especially in shot guns, has now come to be recognized as a highly desirable feature, since it allows the framework of the firearm to be made of a solid-wall construction without openings at the top, sides, front, or rear, which not only excludes rain, dirt, etc., but also, and in a very positive manner, prevents injury to the user from escaping gas, or from the blowing back of broken parts or pieces of a cartridge which may have been prematurely exploded.

My new kind and arrangement of carrier and ejector combined in one device, can be employed with various types or kinds of breech actions, and is particularly effective in cases where the mechanism,—as in my said prior patent,—discharges the cartridge-shell from the receiver-chamber past the entrance of the magazine into said chamber; usually this ejector-stroke is in a downwardly direction, since the magazine is usually and preferably located below the barrel. When thus arranged, the mechanism first ejects the extracted cartridge downward past the magazine opening, and then allows a fresh cartridge to escape from the magazine and rest upon the carrier, after which the cartridge is raised into alinement with the barrel-chamber, and is held in such alinement while it is being driven into the barrel. The carrier is next moved upward out of the way, and by the same movement is located in a position above the barrel entrance at the forward end of the mechanism-chamber, so that the next cartridge-shell to be extracted from the barrel-chamber will be drawn backward underneath the carrier.

The carrier device in the preferred form thereof herein illustrated, is arranged for operation as a single member. In some instances, this member may be formed in a single piece, but it may also be constructed in two parts, as hereinafter more fully explained. In the latter case, the two parts will usually be operated either substantially or exactly in unison, and hence would act as one device. The arrangement of the device into two parts, therefore, does not essentially change the functions of the carrier, but is in some respects an improvement for the purposes of facilitating the manufacture and assembling of the mechanism.

With reference to any pair of members which are, or are herein described as being coöperating for some given purpose or function, (as for instance the sliding base-member and the carrier), when one member of the pair is set forth or defined as having appurtenant thereto an actuator which is in position and arranged for operating the other member of such pair, it will be understood that the said other member so operated or actuated will be suitably furnished or arranged with some means or device which will properly coact for the required purpose with such specified actuator member. For instance, in certain of the subjects-matter herein set forth or defined, the base-member of the breech action is described as having appurtenant thereto an actuator or means in position and arranged for actuating the carrier in some specified manner or timing; and, for illustration, it may be noted that in one such instance there is a forwardly-located actuator appurtenant to the base-member and in position and arranged for shifting said carrier (on a described further forward movement of the base-member) from an intermediate, or "loading-in position," to a position above a shell issuing from the barrel; this latter position is also designated as the shell-receiving position.

In the accompanying drawings forming a part of this specification, Figure 1 is a side view or elevation, of a magazine firearm made in accordance with my present invention, and Fig. 2 is an under-side or inverted plan view drawn in alinement with Fig. 1; in these views,—which show portions of the stock, barrel and magazine broken away,—the frame or receiver is shown in a preferred two-member form thereof, but only a few of the details of the mechanism are shown or indicated.

Fig. 3 is a side view similar to Fig. 1, but with the right-hand receiver wall broken away for illustrating certain features of the mechanism chamber within the receiver; Fig. 4 is a side view corresponding in part to Fig. 1 and in part to Fig. 3, for further illustrating the preferred "take-down" construction shown in Figs. 1 and 3, whereby the "receiver," or front frame-member 2, may be conveniently and effectively secured in a releasable manner to the guard or rearward frame-member 3, and Fig. 4ª is an end view of the guard frame 3 as seen from the right hand in Fig. 4.

Fig. 5 is a side view corresponding with Figs. 1 and 3; in this view the frame members are broken away or shown in section in a conventional manner, for more fully and clearly showing the breech action and carrier, and certain of the details which are cooperative therewith, as hereinafter more fully explained.

Figs. 5ª, 5ᵇ, and 5ᶜ, are views similar to a portion of Fig. 5, for further illustrating the mode of operation of certain details of the hammer-trigger mechanism; of those views, Figs. 5ª and 5ᵇ include a side view of the slide lock 22, which is thus shown in two successive positions, respectively, while Fig. 5ᶜ further illustrates some features of a preferred means for retracting and preliminarily locking the hammer, temporarily, in a non-firing position.

Fig. 5ᵈ is a sectional view taken on the line $X^{5d}$, of Fig. 5, for showing certain of the features and details which are located at the left-hand of said line as seen from a point at the right-hand thereof; in this view, the head portion of the breech-bolt, 7, is shown by dotted lines in firing position.

Fig. 6 is a side elevation similar to Fig. 5 for illustrating the positions of the principal operating parts when the slide, 6, of the breech action has been retracted to a point where the rotative disengaging movement of the breech-bolt has been completed so that on the further rearward movement of said slide the bolt will move rearwardly in unison therewith.

Fig. 6ª is a cross-sectional view on line $X^{6a}$, of Fig. 6, and illustrates the position of the head portion of the breech-bolt 7 relatively to the receiver, when said bolt is rotated to the position shown in Fig. 6, where the rearwardly moving breech action is about to begin the withdrawal of a shell, (Fig. 20), from the barrel, 1.

Fig. 7 is a view similar to Fig. 6, but showing the breech action retracted to the point of completely withdrawing the shell from the barrel, the carrier being as in Fig. 6 in its uppermost position and the mechanism being in position (see, also, Fig. 21) for beginning the ejection of the shell; Fig. 7ª is a partial sectional view in line $X^{7a}$, Fig. 7, for illustrating the position of the carrier arms as shown in Fig. 7, and Fig. 7ᵇ is a view similar to Fig. 7ª but taken in the line $X^{7b}$ of Fig. 7; these views illustrate certain relations as between the carrier, the extractor and the extracted shell at the time when the operation of ejecting the shell is about to begin.

Fig. 8 is a side view or elevation similar to Fig. 5, but showing the breech action fully retracted and the carrier in its lowermost or cartridge-receiving position, which is also shown in Fig. 18; Fig. 8ª is a sectional plan view in about the line $X^{8a}$, Fig. 8, and shows the carrier arms in plan view, while some details are omitted; Fig. 8ᵇ is a cross-sectional view in line $X^{8b}$, of Fig. 8, and shows the parts at the left hand of said line as seen from a point at the right hand thereof.

Fig. 9 is a side view in which some parts of the frame are broken away, and illustrates a position of the operating parts when the breech action has been somewhat advanced from its most rearward position, and the carrier has just been elevated to the loading-in position.

Fig. 10 is a view similar to Figs. 5, 8 and 9 and illustrates a more advanced position of the breech action in which the breech-bolt is advanced to firing-position while the carrier is elevated, (in advance of the completion of the forward movement of the bolt-carrying slide of the breech mechanism), to its uppermost or shell-receiving position.

Fig. 11 is a side view similar to Fig. 5, but with the breech action shown in vertical, longitudinal section, and with some details omitted for more clearly showing other parts.

Fig. 11ᵃ is a plan view of the firing mechanism, and shows the principal operative details thereof arranged above a forward portion of the guard-frame 3; Fig. 11ᵇ is a detail view further illustrating the operation of the hammer-actuator and the slide-lock.

Figs. 12, 13 and 13ᵃ are, respectively, a plan, side elevation and end elevation of the base-member or slide, 6, of the breech action; these views are drawn in alinement, or projection, in a conventional manner to facilitate comparison.

Fig. 13ᵇ is a cross-section of the slide 6 taken on line X¹³ᵇ, of Fig. 13; and Fig. 13ᶜ is a side view of the removable slide-guide shown in section in Fig. 13ᵇ.

Fig. 14 is a longitudinal vertical section of the slide 6, taken on the line X¹⁴ of Fig. 12; this view, Fig. 14, only shows that portion of said slide which is above the line X¹⁴ in Fig. 12.

Fig. 15 is a diagrammatic and fragmentary side view showing the carrier by solid lines in the position thereof shown in Fig. 5, and by dotted lines in the position thereof shown in Fig. 8, while the slide 6 is indicated by solid and dotted lines respectively, in its extreme forward and rearward positions relatively to the carrier; these carrier and slide positions also correspond to Figs. 22 and 18 respectively.

Fig. 16 is a plan view of the preferred arrangement of a two-arm carrier in which the arms are physically unconnected though operable as a single device, and Fig. 17 is a side view of one arm or half-portion of such carrier; these two views are drawn in alinement, and in Fig. 17, a withdrawn shell is indicated by dotted lines in a relative position ready for the beginning of the shell-ejecting operation, which is further illustrated in Fig. 22.

Figs. 18 to 22 (including Figs. 19ᵃ, 19ᵇ), are a series of seven views supplemental to Figs. 15, 16 and 17, and are specially arranged for illustrating the principal successive positions and functions of the carrier-member 8,—operating both as a cartridge-elevator and as a shell-ejector,—with relation to such carrier-actuating means and other parts of the fire arm mechanism as most directly coöperate therewith during the successive stages, respectively, of the complete cycle of operations; of these seven views, Fig. 19ᵃ is a sectional view on line X¹⁹ᵃ of Fig. 19, and Fig. 19ᵇ is a similar view on line X¹⁹ᵇ of Fig. 19.

Figs. 23 to 26 (including Figs. 24ᵃ, 25ᵃ), are a series of eight detail and fragmentary views for illustrating certain features of the construction and mode of operation of a preferred form and arrangement of breech-bolt, firing-pin and extractor which are comprised in the particular form of breech action which I have selected as being convenient and suitable for assisting in the illustration herein of the improvements which constitute the subject-matter of this present application.

Figs. 27, 27ᵃ, 28 and 28ᵃ, are detail views showing,—on a somewhat enlarged scale,—some of the operable parts of the adjacent views, Figs. 6 and 6ᵃ.

Figs. 29 to 31ᵇ, are a series of nine views further illustrating the magazine mechanism, and the means comprised in or appurtenant to the same, for detaining and releasing the cartridges; in this series of views, Fig. 29 is a cross-sectional view about on the line X²⁹ of Fig. 8; Fig. 29ᵃ is a fragmentary longitudinal section (corresponding to a portion of Fig. 8) taken on the line X²⁹ᵃ of Fig. 29, and showing parts at the left-hand of said line; Fig. 29ᵇ is a companion view to Fig. 29ᵃ, being taken on said line X²⁹ᵃ and showing parts at the right-hand of said line as seen from the left-hand thereof; Figs. 30 and 31 are views similar to Fig. 29, and illustrate different positions of certain of the operative details, which positions are further shown in Figs. 29ᶜ, 30ᵃ and 31ᵇ; and, Fig. 31ᵃ is a view similar to Fig. 29ᵇ and is supplemental to Fig. 31ᵇ for indicating an intermediate stage in the delivery of a cartridge from the magazine tube, 5, onto the carrier 8,—this operation being shown completed in Fig. 8.

Figs. 32 to 32ᵈ, are a series of five diagrams for further illustrating certain of the coöperative relations and movements as between the combined carrier and ejector 8, the breech-bolt 7, and the magazine and barrel, as hereinafter more fully explained.

Fig. 33 is a diagram illustrative of certain of the operational features which are represented in the series of views, Figs. 32 to 32ᵈ, inclusive.

Fig. 33ᵃ is a companion view of, and is drawn in alinement with Fig. 32ᵃ, and is arranged for illustrating a variation and supplemental feature which sometimes may be employed, but which is not fully shown in the series of views, Figs. 32 to 33, inclusive.

Fig. 33ᵇ is a diagram similar to Fig. 33, except that it is arranged for illustrating the variation and supplemental feature indicated in Fig. 33ᵃ, as hereinafter more fully explained.

Figs. 34 and 35 are, respectively, a plan and a side view, and correspond substantially with Figs. 16 and 17, except that the two-arm carrier is here shown with the two side-parts, or side arms, thereof connected together,—preferably in a rigid manner and also integrally,—for simultaneous operation.

Fig. 35ᵃ is a fragmentary sectional view on line X³⁵ᵃ, Fig. 35, and corresponds with Figs. 8ᵇ and 13ᵃ; this view, Fig. 35ᵃ, is drawn in alinement with Fig. 35 and illustrates, in connection therewith, certain features of the coaction as between the breech action and carrier.

Figs. 36 and 36ᵃ are views similar in arrangement and purpose to Figs. 16 and 17, for showing the carrier when this member is constructed in the single-arm form and arrangement; Figs. 36ᵇ and 36ᶜ are cross-sectional views showing the one-arm carrier in two different positions, as it would appear when seen from the right-hand in Figs. 36ᵃ and 35, respectively; of these four views, it will be noted that Fig. 36ᵇ corresponds with the view in Fig. 19ᵃ illustrating the two-arm form of the carrier, while Fig. 36ᶜ similarly corresponds with Fig. 7ᵃ.

Fig. 37 is a diagram arranged as a cross-sectional view in about the line Xᶜᵃ, Fig. 6, for illustrating the various relations existing at successive stages in the operation, or cycle of movement, as between the carrier and the shell of a cartridge.

Figs. 38, 38ᵃ and 38ᵇ, are a series of diagrams illustrating a feature of operation of one part of the preferred carrier-actuating means herein selected for illustration, whereby the carrier may be operated from the loading-in position thereof toward the shell-receiving position thereof, by an accelerated movement and during the later stage of the forward movement of the base-member of the reciprocatable breech action.

Fig. 39 is a diagram further illustrative of certain features of construction and of operation of the carrier as shown in Fig. 16; this diagram, Fig. 39, is also supplemental to Figs. 18 to 22 inclusive.

Similar characters designate like parts in all the views.

The principal members of the firearm mechanism are indicated in the drawings by the following characters, viz: the barrel, by 1; the receiver, or forward frame-member, by 2; the guard-frame or rearward frame-member, by 3; the trigger, by 4; the magazine, by 5; the base-member, or "slide" of the breech action, by 6; the breech-bolt, by 7; the carrier, which in this instance, is a combined carrier and ejector, by 8; the extractor, by 9; the bolt-stop, or action-bar latch, by 10; the cartridge-stop, at the magazine entrance, by 11; the magazine follower, by 12; the magazine spring, by 13; the hammer, by 14; the sear, by 15; the safety-sear, by 16; the firing-pin, by 17; the stock, by 18; the carrier detent, by 19; the action bar, by 20; the take-down screw, by 21; the slide-lock, by 22; the main-spring, by 23, and the main-spring rod, by 24.

By means of my present improvements, the firearm may comprise a frame or receiver having an opening in only one of the four sides thereof, so that the right-hand and left-hand sides, as also the upper side, may be unperforated by any opening which would permit the escape of gases, or metal débris in the event of a back-fire or of a premature explosion of a cartridge at any time during the loading operation. For meeting such conditions in the most desirable manner, the frame, or receiver, as 2, is preferably provided with an ejection opening as 2ˣ, (Figs. 5, 6, 6ᵃ), only in the one side thereof which is the lower side when the firearm is held in the usual manner, this being the arrangement shown in the drawings.

The mechanism chamber, within which the breech action and associated devices are assembled, is herein shown inclosed by the walls of a frame-work which comprises the receiver 2 and the guard-frame 3, and these two members are shown separably united by means of an improved construction which is not claimed herein, but which constitutes in part the subject-matter of a separate application to be copending herewith. This two-member frame construction as regards certain features thereof, is in the nature of a "take-down" device, whereby to open the mechanism-chamber in such a manner as to facilitate the assembling therein and removal therefrom of the working parts. A further feature herein shown, but also to be comprised in the subject-matter of said separate application, is the means for removably mounting the sliding base-member, as 6, of a breech action which is reciprocatable in the receiver.

The construction of the two-part frame, and the arrangement of the breech action slide 6 with the two removable guides 6ᵃ, 6ᵃ′, (Figs. 8ᵇ, 13ᵇ), provides, among other advantages, an effective means for limiting the retraction of the breech action by the direct engagement of a stop-face, as 6ᵇ, of the slide 6 with an abutment-face, as 2ᵇ, (Figs. 7, 8), of the forward frame or receiver 2. When the rearward frame-member, or guard-frame 3, is removed the slide 6, when retracted, will project far enough rearwardly of the receiver 2 for access to and the removal of the guide-retaining pin 6ʸ, (Fig. 8), whereupon the guides 6ᵗ, 6ᵗ′, may be withdrawn rearwardly from between the slide-block 6 and the receiver walls, after which the slide itself may be bodily lowered and thus taken out of the receiver. By this organization of said members, a fixed abutment, as 2ᵇ, may be provided as an integral part of the receiver, and may be located, (Fig. 8), directly in the line of movement of said stop-face 6ᵇ, while providing a convenient method of assembling and taking down the mechanism. Said guides 6ᵃ, 6ᵃ′, fit in the guideways 2ˢ, 2ˢ′, respectively, of the receiver, and are preferably interlocked,—by a tongue-and-groove construction,—with the slide, (Fig. 13ᵇ), and thus form, in effect as regards operation, a component part of the sliding base-member of the breech action. This construction provides great strength, and also for a free sliding movement of the base-member in the frame, while the projecting ribs or guides $6^s$, $6^{s'}$ engage in the respective channel-form guideways of the frame.

The reciprocatable breech action is herein shown as comprising a slidable base-member, as 6, (which in practice may have any suitable form and proportions), and a rotatable bolt-member, as 7, which operates in combinations that include the extractor and firing-pin, together with the several details and features thereof; these improvements, however, are not specifically claimed herein; but will constitute in part the subject-matter of a separate application to be copending herewith.

The usual action bar, as 20, may be conveniently coupled to the slide 6 by means of the rib $20^a$ formed on the action bar and engaged into a suitable slot in the slide 6. An ordinary hand piece or operating handle,—not shown,—may be fastened to the action bar 20 forwardly of the receiver, in a well-known manner, for the purpose of operating the breech action. In the principal views, the action-bar 20 is shown located on the left-hand side of the firearm, but it may be arranged on the right-hand side, as indicated in Fig. $36^b$.

For the purpose of simplifying in the accompanying drawings the illustration of my present improvements, only one form and arrangement of the reciprocatable breech action is shown therein.

This preferred form of breech action has the base-member, as 6, arranged for a sliding movement, and in now describing the construction and arrangement of the details of the firearm, said member 6 will be sometimes referred to, for convenience, as a "slide," or as "the slide," or as being slidable, as the case may require. In some instances, however, such a slide or base-member may be of a curvilinear form, and may be so arranged as to have a pivotal support, and thus have an oscillating forward and rearward alternate or reciprocating movement, (not herein shown), within the purview of my invention and as regards some of the combinations herein defined.

For actuating the firing-pin by a suitable blow thereon, I have illustrated in the drawings an improved hammer-sear-trigger mechanism which is not specifically claimed herein, but which will constitute in part the subject-matter of a separate application to be copending herewith. In practice, other kinds and forms of mechanism may be employed for effecting the firing of the charge, in connection with the breech action and carrier combinations which are defined in the claims of this present application, or herein set forth. In the preferred arrangement of such a hammer-mechanism selected for illustration herein, the hammer, as 14, is pivotally supported in the frame of the firearm, and is provided with coacting devices which will be understood from the references made thereto in the course of the following description of the firearm - mechanism and of the mode of operation thereof.

Since the cartridge shell is ejected or expelled downwardly past the rearward end of the magazine, the entrance from the magazine to the mechanism-chamber in the interior of the receiver should be guarded by some suitable detainer means whereby the cartridges may be releasably held in the magazine. In the drawings a preferred kind and form of such a detainer device is shown, but as regards a proper coaction with the breech action and carrier, the detainer device or means may have any suitable construction. The particular kind and form of said devices which are herein illustrated, are not specifically claimed herein, but are regarded as embodying a separate invention, and therefore will constitute in part the subject-matter of a separate application to be copending with this present application.

The mechanism chamber incloses a combined loading, firing and shell-ejector mechanism which comprises carrier-actuating means, and also comprises, as one member or device thereof, a carrier which is operable transversely of the barrel, to and from three positions, viz., one terminal position (Fig. 8) for receiving (on the side thereof toward the barrel) a cartridge from the magazine, a second terminal position (Figs. 5, 6) for receiving (on the side thereof toward the magazine) a shell from the barrel, and a third and intermediate position (Fig. 9) for holding a cartridge in loading position. Said combined mechanism also comprises a breech action which is operably-supported in said chamber for a retraction stroke from a firing position, (Fig. 5) and is arranged for actuating (on the full retraction thereof), the said carrier to its said first or cartridge-receiving position, and is also arranged for actuating (on a forward stroke thereof to firing position) the said carrier to its said second or shell-receiving position.

On the front end thereof, the mechanism chamber within the receiver, is in communication with the barrel, 1, and with the magazine, 5, which are thus in a position forward of the receiver and the said chamber thereof; and, the barrel and magazine are so arranged that the magazine entrance,—see Fig. 5,—is on a line, or at an elevation, between the barrel-chamber and the ejection opening $2^s$. This arrangement provides for the carrier, or the cartridge receiving end thereof, as $8^n$, having one terminal stroke position in a cartridge-receiving position which is relatively between the magazine entrance and the ejection-opening at 2ᵍ; such a position of one form of such a carrier is shown in Figs. 8 and 18. This arrangement also provides for the carrier to have a working stroke from said cartridge-receiving position (Fig. 8) to a shell-receiving position (Figs. 6, 7 and 21) in which the carrier end, 8ⁿ, is on the opposite side of the barrel entrance from the said ejection opening.

In Fig. 5, it will be noted that the carrier 8 lies in its upper position, so that the cartridge-shell, in being extracted from the barrel-chamber, can be drawn back under the carrier. When the carrier is pivoted near the rearward end thereof in the receiver, as at 8ª, and is then elevated to the shell-receiving position (see Figs. 5, 6, 7, 17, 20, 21, 32ᶜ, 32ᵈ) it may be yieldingly held in that upward or normal position by some suitable detent at 19. For this device, I have shown a well-known kind of spring-actuated slidable plug, as 19ª (Fig. 6) of tubular form, combined with an actuating spring 19ᵇ, said plug being contained in a hole formed in the frame and bearing against a cam-face as 8ᵏ, of the carrier, as clearly indicated in and by the drawings.

The two-part framework, in the preferred form and arrangement thereof herein illustrated, may be separably connected by interlocking means which are appurtenant thereto, and are used in combination with some suitable locking device. One arrangement of such means and device is indicated in, and will now be described in connection with Figs. 3, 4 and 4ª. For holding the receiver, 2, in proper alinement with and in position laterally of the guard-frame 3, the receiver is shown provided with ribs 2ⁿ, 2ⁿ′, which closely engage in corresponding grooves, 3ⁿ, 3ⁿ′, formed in said member 3. At its forward end (Figs. 3, 4) the member 3 has projections, 3ᵈ, 3ᵈ′, which closely engage in recesses, 2ᵏ, 2ᵏ′, (Figs. 3, 4) and thus prevents any separation of the forward end of the frame 3 from the receiver 2, when the two said parts are assembled together as in Fig. 3. At this time, the nut portion 3ᶜ (Figs. 4, 11) rests within a recess in the member 2, while the cupped-head screw 21 has the head rim 21ª thereof engaging in an annular groove, 2ʲ, (Fig. 11) whereby said rim also engages forwardly of the receiver-rim 2ʲ′, and rearwardly of the frame-rim 3ʲ. Thus the screw-head 21 serves as a clamp-device which engages (by means of said rims) with both receiver and guard-frame, and thereby firmly connects these members. By partially withdrawing the screw, as at 21, Fig. 4, the receiver 2 may be slid forwardly (as there shown) on the frame 3, whereupon the frame 3 may be lowered and removed, together with the hammer-mechanism (Figs. 11, 11ª) which,—in the present instance,—is shown assembled thereon.

In Figs. 3, 4, 4ª, I have designated a usual form of trigger-guard by 3ʰ; in practice this guard may, preferably, as indicated in the drawings, be made integral with the main portion of the guard-frame 3. Also, I have here indicated at 3ᵇ, the position of a usual form of trigger-stop which, for convenience of illustration, is not repeated in all of the figures in which the member 3 is shown; such a trigger-lock being a well-known device, and one which need not be used in all cases, therefore it need not be more fully described.

The breech action is retractably supported in the frame and, when properly equipped, constitutes a loading mechanism. In the arrangement thereof herein illustrated, the base-member of the breech action has a sliding form, as 6. In practice, this slidable member is preferably provided with a breeching-member not of the usual "block" kind or form, but with one having the form of a rotatable "bolt". For this purpose the slide-member 6 is herein shown provided with the upwardly projecting bearing, 6ª, in which a central bore, 6ᵇ, Fig. 13ª, is made for receiving the tubular stem, 7ª, of the bolt-head 7. The bearing 6ª and stem 7ª are shown provided with means whereby to impart to the stem a rotatory movement when the stem is moved either forwardly or rearwardly in said bearing. One suitable means for these purposes consists of coacting helical ribs and grooves, as ribs 7ᵇ, 7ᵇ′, on the stem, and grooves 6ⁿ, 6ⁿ′, in the said bearing 6ª, whereby the movement imparted to the bolt 7 relatively to said bearing is of a helical character. These movements, however, occur only during a longitudinal movement of the base member relatively to the receiver and, while the bolt has only a rotatable movement relatively to the receiver; a leading purpose of this arrangement is to lock and unlock the bolt-head 7, to and from the receiver, these positions being indicated in Figs. 5 and 6, respectively.

In Fig. 6ª the locking lugs 7ᵈ, 7ᵈ′, on the breech-bolt are shown rotated out of engagement with the locking shoulders 2ª on the receiver, and the top lug 7ᵈ′ is in position to enter the slot 2ᵇ, (Fig. 5ᵈ), formed in the top of the receiver. The unlocking rotation of the breech-bolt is limited by the side 7ᵈ′ of the lug 7ª striking against the side face 2ᶜ of the rib 2ᵛ in the receiver,—Figs. 6ª and 5ᵈ. The breech-bolt at its front end also carries a lug, or projection, 7ᵗ, which passes through the opening 2ᵉ during the unlocking rotation of the bolt, and at the completion of this unlocking rotation, the lug 7ᵗ occupies a position adjacent to the surface 2ᶠ in the receiver. Thus the breech-bolt, in its successive backward and forward movements, will be guided and prevented from further rotation by means of the oppositely-disposed faces of the lugs 7ᵉ′ and 7ᶠ bearing against correspondingly opposed surfaces 2ᶜ and 2ᶠ in the receiver,—see Fig. 6ᵃ.

The slide 6, (see Figs. 8, 8ᵇ), is shown provided with short depending wall, 6ʲ, which is seen in end view in Figs. 8ᵇ and 13ᵃ, and which runs within the slot or guideway at 3ᶠ, (Figs. 8ᵇ, 9, 10), of the guard-frame 3. The rear end face 6ʲ of said guide-wall or part 6ʲ is shown inclined downwardly and forwardly, for more suitably bearing against the slidable resistance plug or yielding abutment 25, which may be forwardly actuated by a spring, as 25ᵃ, and is limited in its forward movement by the transversely-located pin 25ᵇ arranged for engaging in a recess in one side of said abutment member. On the rapid retraction of the breech action to the extreme rearward end of its working stroke, said slide face 6ʲ strikes against the yielding, spring-resisted abutment 25 which thus acts to absorb the momentum of the rearwardly moving parts, and thereby normally to bring the breech action to rest in the position indicated in Fig. 8, and with a minimum of shock. Also, the spring 25ᵃ being then more fully compressed, this spring normally reacts for at once inaugurating the succeeding forward movement of the breech-action, and thus tends to accelerate the operation of the firearm mechanism, while requiring a smaller amount of power than otherwise to be supplied through the action-bar 20. It will be understood, however, that in some instances, this reaction abutment device (which is primarily for initially and forwardly actuating the breech action), may be omitted; also, that when this device shall be employed, the spring 25ᵃ may be so made as to give a relative small or a larger resistance, according to the requirements or preference of the maker or user. Also, the length of stroke of the abutment member 25 may be varied, by suitably arranging the construction and proportions thereof in connection with the devices cooperative therewith.

Referring now to the drawings, it will be seen that in Fig. 5, the breech action mechanism is shown in its forward and locked position ready for firing. Also, in this view the hammer 14 is cocked, compressing the main spring 23 which surrounds the main spring rod 24, and the rear end of the main spring by thrusting against the slide lock 22 tends to raise the front end of this lock, and thereby bring the lock-face 22ᵃ (Fig. 5ᵃ) upward to a position immediately back of the face 6ᵏ of the slide 6 and thus prevent the breech action from moving rearward until said lock end is depressed by hand or by the hammer in moving forward during the act of firing. This latter position and operation further is illustrated in the diagram Fig. 5ᵇ. For the said manual release of the slide-lock, the forward end thereof (Figs. 5, 5ᵃ, 5ᵇ) is shown provided with a roughened finger-piece 22ᵇ, which is accessible through the ejection opening of the frame, as will be obvious from a comparison of Figs. 2, 5, 5ᵃ, 5ᵇ and 5ᵈ.

Since the hammer-trigger mechanism herein illustrated, is not herein claimed as a part of the subject-matter of this present application, therefore, I will herein only describe this mechanism in a brief and general way. The hammer 14 is held in its cocked position (Figs. 5, 5ᵃ) by means of the sear 15 to which the trigger, 4, is secured (operatively connected) by means of the pin 4ᵃ. The sear 15 is shown supported in the frame 3 on a pin 15ᵇ, so that pulling the trigger backward in the usual manner, (Fig. 5ᶜ), moves the top end of the sear 15 backward, (Fig. 5ᵇ), thereby disengaging the face 15ᵃ of the sear from the notch or face 14ᵃ of the hammer; this allows the hammer to swing upward on its pivot 14ᵇ, as shown by the dotted lines in Fig. 5ᵇ, to strike the rear end, 17ᵃ, of the firing-pin, 17, so that its front end 17ᵇ will project through the face of the breech-bolt and reach the primer of the cartridge, as indicated in Figs. 11, 11ᵇ, and 23ᵃ.

On the described forward movement of the hammer, 14, from the cocked position (Fig. 5ᵃ) to the position shown by dotted lines in Fig. 5ᵇ, the actuator-face 24ᵃ which is appurtenant to the hammer, operates upon the face 22ᶜ of the slide-lock 22, to withdraw the breech action-locking face 22ᵃ out of engagement with, and out of the path of movement of, said face 6ᵏ. During this operation, the hammer and said connected device may be said to constitute a slide-lock-retracting actuator. The movement of the pivot-pin 24ᶜ from its position in Fig. 5ᵃ to its position in Fig. 5ᵇ so shifts the line of action of the spring as between the forward pivot 14ᵇ and the rearward pivot 22ᵒ, as to materially reduce the angle of action so that the spring 23 will transmit but little if any lifting force to the locking member 22, until after the hammer shall have been again retracted. The above described mode of action of the actuator 24, hammer 14 and lock-bar cam-face 22ᶜ, is further illustrated in Fig. 11ᵇ, where the actuator face 24ᵃ, is shown in two positions relatively to said face 22ᶜ.

On the sear 15 being drawn back (as in Fig. 5ᵇ) to release the hammer from its position in Fig. 5ᵃ, the rearward catch 15ᶜ of the sear is carried under the slide-lock catch 22ᵈ, so that when the slide-lock member 22 is swung downwardly to its lower position as in Fig. 5ᵇ, said catch 22ᵈ thereof engages the sear catch 15ᶜ for preventing the sear from again moving forwardly until after said member 22 shall have been returned to its said upper position, as in Fig. 5ᵃ. The hammer on being released from the sear, is driven forward by the spring 23 and rod 24, from the dotted position 14 in Fig. 5ᵃ to the dotted position 14 in Fig. 5ᵇ, and during this firing stroke of the hammer, the face 24ᵃ of said rod 24 (in this instance shown as a rounded corner) acts upon the cam-like depression-face 22ᵇ of said lock member 22, and thereby depresses this member in the manner and for the purpose above set forth. The said downward movement of the lock 22 unlocks the slide 6 as already mentioned, (Fig. 5ᵇ), so that on the firing of the charge, the slide 6 is ready for instant retraction, and during this rearward movement will reset the hammer in engagement with the safety-sear 16, as in Fig. 5; this safety-locked position of the hammer is then maintained until, in going forward, the slide 6, by permitting the lock-bar 22 to rise up, and so unlock the sear 15,—as in Fig. 5ᵃ,—thus permits the trigger to resume its forward and operative position.

A further feature of this hammer-sear-trigger mechanism relates to a safety-locking of the trigger when the hammer is retracted ready for firing. When the firearm mechanism is in firing position, (Fig. 5), if the operator lowers the slide-lock 22 (as in Fig. 5ᵇ) the slide 6 is thereby unlocked, (Fig. 5ᵃ); but, at the same time, the face 22ᵈ of the member 22 is brought down to the rearward of the sear-catch 15ᶜ, as shown at 22ᵈ' by dotted lines, so that the sear, and through this the trigger are thereby blocked against retraction, while the forward sear-catch 15ᵃ is locked into an engageable position relatively to the hammer face 14ᵃ. Thus while the member 22 is held down by hand,—or is so held by the retracted slide,—the said firing devices are locked in a safety position.

In Fig. 11, the safety-sear 16 is shown bearing forwardly at the upper end thereof against the hammer 14, while this member engages the firing sear 15, similarly as in Figs. 5 and 5ᵇ; at this time, the trigger is in forward position, so that said sear 16 is held retracted by the forward end 16ᵇ thereof bearing against a face at 4ᵇ on the trigger. The safety-sear 16 is shown as being forwardly actuated by a small spring, 16ᶜ, (see Fig. 5ᵃ), which may be applied or arranged in various ways in accordance with a well-known practice; in the present instance, however, the spring 16ᶜ is shown in position for reacting against a surface on the forward arm of the sear 15. In practice, the trigger, 4, will be, or may be, forwardly actuated by some suitable spring, to be applied in any usual or convenient manner, and hence such spring is not herein shown.

For locking the breech-bolt 7 to the receiver 2, when the breech action is in the forward, or firing position thereof,—Fig. 5,—the breech-bolt is shown provided with two locking lugs 7ᵈ and 7ᵈ' which are rotatable to a position in front of a pair of shoulders 2ᵃ, 2ᵃ', formed in the receiver, preferably as indicated in Figs. 5 and 5ᵃ. This bolt and frame engagement effectively sustains the rearward thrust of the cartridge during the explosion, and being of a well-known kind will now be understood without a more detailed description thereof.

In the operation of the breech action, the breech-bolt,—in addition to its rotative movements,—may have a relatively long stroke relative to the slide 6. Thus in Figs. 6, 8 and 9, the bolt 7 is shown in its forward position relatively to said slide 6, while the slide is in its extreme rearward position in Fig. 8, and is in an intermediate part of its stroke in Fig. 9; in Fig. 5, the bolt 7 is shown in the extreme rearward position thereof relatively to slide 6, while both the slide and the bolt are in the extreme forward position thereof relatively to the frame and the barrel. When the breech action, during its forward movement, comes to the position in Fig. 6, the bolt 7 is ready for beginning to be turned into locking engagement with the frame, and in Fig. 5, this locking movement is completed, so that from the position in Fig. 6 to the position Figs. 5 and 16, the bolt remains stationary (as regards endwise movement) while the slide 6 continues to advance to firing position.

Said forward movement of the slide 6 relatively to the bolt 7 is herein provided for by the spiral ribs 7ᵇ, 7ᵇ', of the bolt engaging in the nut grooves 6ⁿ, 6ⁿ', of the bearing 6ᵇ of the slide. When this relative slide advance has reached a point (not fully shown) about midway between the positions in Figs. 10 and 5, said bolt ribs 7ᵇ, 7ᵇ' pass partially out of engagement with the said grooves, so that during the latter portion of said relative advance, the bolt 7 is non-rotating, and so that the face 6ᵍ of the slide runs forwardly under the lug 7ᵈ of the bolt, and thereby positively blocks the bolt from turning backwardly. Thus the face 6ᵍ of the slide (forward of said bearing 6ᵃ, Figs. 6, 13) by engaging under the face 7ᵉ of the bolt-head (Figs. 5, 23ᵇ) during the said final part of the forward slide movement, securely locks the bolt in firing position while the guard-face 6ᵐ at the rearward end of the slide (Fig. 11) is being brought forward to the position required for thereby permitting the hammer, 14, to be swung upwardly and strike the firing pin as shown by the dotted lines in Fig. 11. On the initial retraction of the slide 6 from firing position, said face 6ᵐ (or the roller 6ᵏ′, when this is provided) forces back the hammer, 14, before the bolt begins to be turned for the unlocking thereof from the frame; and by this means the slide may have a considerable amount of rearward movement wherein to acquire momentum, so that on engaging the said bolt ribs, the relatively heavy slide acts after the manner of a hammer, and by a sharp blow imparts a powerful turning movement to the bolt-head 7, for thereby first overcoming (by an impact action) such an adhesive effect as may normally (in some instances) result from the pressure of the powder gases, and then disengaging the said lug-faces from the coacting frame faces. This portion of the firearm mechanism however, will be more fully described in a separate application, as already mentioned.

The "magazine mechanism" constitutes one of the component mechanisms of the firearm, and may be said to comprise a suitable tube, as 5, combined with some suitable spring-actuated means (such for instance as a follower, as 12) for pressing the cartridges rearwardly, and with some operably-arranged cartridge retaining and releasing means. One suitable kind of retaining and releasing means is illustrated in the drawings, and comprises a pair of separately operable devices one of which is positively actuated by the breech action subsequent to the locking of the breech-bolt in firing-position, while the other is operable in one direction by an ordinary spiral spring and in the other direction by the magazine spring acting through a follower and a cartridge, and is blocked,—during a proper period of time,—by means appurtenant to the breech action. A preferred form and arrangement of such a cartridge-retaining, or detaining, stop-device is shown in the drawings, being specially illustrated in the detail views Figs. 29 to 31ᵃ, and for convenience, is designated in a general way,—as a whole,—by 11. Similarly, a preferred form of a cartridge-shifting releasing device (which is not, by itself, a cartridge-stop) is similarly designated in the same views, by 10. Thus the operation in the firearm mechanism, of the element "magazine-mechanism", is normally timed and controlled by the breech action through some parts or means appurtenant thereto; also, this control, (and the timing as regards the releasing of a cartridge), is effected at a time when by a complete retraction of the breech action, the swinging carrier, as 8, is in its most inclined position downwardly and forwardly from the pivotal axis thereof at 8ᵃ, (see Figs. 8, 18). However, the said cartridge-detainer and releaser 10 is not actuated by the breech action at any time, since the described control by or from the breech action is only permissive in character, so that, on the full retraction of the slide 6, the notch or recess 20ᵇ, in the action bar 20, (Figs. 3, 8), permits the releaser 10 to be actuated, by means not appurtenant to the breech action, and to a position for engaging forward of said action-bar face at 20ᵇ, (Fig. 8), thus directly locking the breech action until a cartridge has been fully delivered out of the magazine, or until the combined releaser and action-bar lock 10 shall have been operated by hand to the position indicated in Figs. 29, 30.

The carrier, 8, is not only shown as being operably-supported and arranged for an oscillating movement and to be coöperative with both the magazine and the barrel, but it is also arranged for actuation to a cartridge-receiving position, (Fig. 8), a shell-receiving position, (Fig. 6), and an intermediate loading-in position (Fig. 9), by means appurtenant to the breech action; these three positions of the carrier are represented together in Fig. 39. This mechanism or "action" comprises a reciprocatable slide and a breech-bolt which is carried on the slide and is also reciprocatable forwardly and rearwardly thereon. The breech-action has appurtenant thereto carrier-actuating means which comprises means in position and arranged for actuating the carrier from the cartridge-receiving to the loading-in position thereof during an initial portion of the forward stroke of the breech action; for actuating the carrier from the loading-in to the shell-receiving position thereof during the forward movement of the slide relatively to the breech-bolt, and also for releasing, or partially releasing the carrier and thereby permitting a short downward or depressive movement thereof from said loading-in position during the forward movement of the slide, and prior to the breech-bolt reaching its forward position, (Fig. 33ᵇ). By the employment of these or analogous means or arrangements, the carrier, in some instances, may be depressed or given a permissive but short downward movement whereby to allow the carrier-end 8ᵇ to pass more freely underneath the head-flange of the cartridge, as specially illustrated by the diagram in said Fig. 33ᵇ.

When "the carrier" is arranged in the form of two oppositely disposed arms, as shown at 8 and 8 in Figs. 8ᵃ, 8ᵇ, and when these arms are not rigidly and directly connected as described in connection with Figs. 34, 35, 35ᵃ, then the breech action should, of course, be provided with means (preferably of a duplicated character) whereby each said side arm of the carrier device will be operated in proper timing with the other said arm. Accordingly, the slide 6 is herein shown provided with two sets of the carrier-actuating faces, as $6^c$, $6^t$, $6^e$, which (in addition to being shown in the principal views) are specially illustrated as to mode of operations in Figs. 18 to 22. For convenience, however, the operation of the carrier has been herein generally described with reference to only one set of such actuating-faces, since in instances where the duplicated sets shall be employed, the arrangement and mode of action of the two sets ordinarily should be, or may be, the same. When the two side-arms, as 8, 8', Fig. 34, are rigidly connected, as by the cross-bar $8^p$, then one of these arms as 8', may be actuated by means of said cross-bar, so that only one set of said actuating faces on the slide 6 need be employed. This arrangement is indicated in Fig. $35^a$, where the actuating faces are provided on the left-hand, at $6^e$, while no such faces are shown or required on the right-hand, under the arm 8' of the integral two-arm carrier device.

Thus the actuating means for the one-arm carrier of the form shown in Figs. 36, $36^a$, may be used also for operating a two-arm carrier of the form shown in Figs. 34 and 35, so that as regards the principal functions of the two-arm form of the carrier, the described duplicated arrangement of carrier-actuating means may be considered as an equivalent for the single actuator arrangement (Fig. $35^a$) combined with such a connection of the pair of carrier arms with each other as will operate one said arm of the pair from (and in proper timing with) the other arm of the pair.

On the cartridge, y,—Figs. $31^a$, $31^b$,—emerging from the magazine, the cartridge head, y', passes above the carrier ends, $8^b$, and engages with the flange-guides or ribs $8^a$, which have the upper guide-faces $8^s$ and the lower guide faces $8^r$; the rearward positions of these faces are designated by $8^{s'}$ and $8^{r'}$, respectively. Next, in moving rearwardly from that position toward the position in Figs. 8, 18, (also, see Fig. 32), the head-flange y' rides along those guides and thus brings the cartridge to an inclined position, first to a medial position, as in Fig. $31^a$, and then to the fully retracted position Fig. 18. At this time,—or slightly earlier,—the shell tube has left the magazine and rests directly on the elevation-faces or carrier faces proper, ready to be elevated into the loading position (Figs. 9, 19, $32^a$), where said upper guide faces $8^s$ are shown located about in alinement with the bore of the barrel 1, and also with the line of longitudinal movement of the breech bolt. This mode of raising the head of the cartridge during the later portion of said rearward movement thereof, is permitted, in practice, by the shell-tube y, being somewhat smaller than,—and freely-fitting within—the bore of the magazine, 5, at the rearward or outlet end thereof, since the magazine bore must, of course, be large enough for the passage therethrough, of the heads of the cartridges. Thus the cartridge may at one time readily take the moderately inclined position in Fig. $31^a$ without being jammed or cramped in the mechanism. By suitably locating said several guide-faces on the respective carrier-arms, 8, 8, the guides may be brought substantially to the parallel position shown in Fig. 9, at the time the loading-in operation is begun,—see Fig. 19, and the kinematical diagram Fig. 39.

When the breech-bolt, driving the cartridge ahead of it into the barrel-chamber, reaches its forward position and is rotated to lock into the receiver, the extractor hook $9^a$ is sprung around the rim of the cartridge in the chamber to engage the front face of the cartridge rim,—see Figs. 5 and 17.

The operation of the mechanism of the firearm will now be readily understood, as regards the loading, firing and shell-ejecting movements, from the foregoing description as illustrated, and especially by comparison of the series of successive positions, and stages of operation, which are indicated in the principal views Figs. 5, 6, 7, 8, 9, 10 and 11. In Fig. 5, the entire mechanism is indicated as being in position ready for firing the cartridge, y, in the barrel 1, this operation being effected,—on pulling the trigger 4,—by means of the hammer-sear-trigger mechanism as already explained. At this time the carrier, 8, is in the upper, or shell-receiving position, which is continued through the stages of movement indicated in Figs. 6 and 7, after which, (and during the later portion of the retractive stroke of the slide 6), the carrier is moved rapidly downward to the cartridge-receiving position shown in Fig. 8. Next, on a partial forward stroke of the breech action, the carrier, 8, is elevated to the mid-stroke or loading-in position shown in Fig. 9, thereby locating the cartridge, y, in line with the barrel 1, and forward of the breech-bolt 7. On the further forward movement of the breech action to the position shown in Fig. 10, the cartridge is pushed fully forward into the chamber of the barrel, and the carrier is then moved up toward its position as shown by solid lines in Figs. 10 and 5. During this final movement of the carrier to said shell-receiving position (Figs. 5, 6, 7, 15, 17, 20, 21), the slide 6 advances relatively to the bolt 7, to the position shown in Figs. 5 and 11, thereby operating the bolt-locking means and coöperating with the magazine mechanism and the hammer-seartrigger mechanism in the manner and for the purposes as elsewhere herein more fully explained.

Considering this general operation of the firearm with relation to the loading of the cartridges into the barrel, Fig. 8 may be assumed to indicate the first stage of the cycle of movements. In this view, it will be noted that the rear-most cartridge $y^2$ (also designated as $y^2$ in Fig. 6) in the magazine tube 5, (being under the tension of the magazine spring 13), is forced backward against the pivotally-supported cartridge stop 11, as also shown in Fig. 29ª. In Figs. 29, 30ª, the head $y'$ of the said cartridge $y^2$ is stopped from rearward movement in the magazine by striking against the transverse stop-face 11ª of the detainer device, or cartridge-stop 11; said stop-face is also shown or indicated in certain other views,—see and compare the detail views, Figs. 27 to 31ª, inclusive.

On the opposite side of the receiver from the cartridge stop 11, is located the bolt stop 10,—also designated as the "action latch", which as illustrated by Figs. 27, 27ª, may have the form of a lever pivoted at 10ᶠ, and having the upwardly extending arm 10ᵍ. The position of the bolt stop 10, in Fig. 27, corresponds to the position of the same part as shown in Figs. 5 and 8. The curved surface 10ª of the bolt stop 10 extends above the cartridge sufficiently to engage the cartridge head $y'$ and thereby prevents the rear end of the cartridge from rising, when the lever-arm 10ᵍ is blocked by the action-bar, as in Figs. 29 and 30. It will be understood, of course, that the rear end of the cartridge could rise or be displaced upwardly out of axial alinement with the magazine by the amount of side play that the cartridge would have in the magazine proper. As seen in Fig. 6ª, the top end 10ᶜ of the bolt stop 10 bears against the side of the action bar 20, so that the curved surface 10ª of the bolt stop will prevent the head of the cartridge from moving upward,—also, see Fig. 28ª. As long as the head of the cartridge is prevented from moving upward and from riding upward and off the inclined face 11ª on the cartridge stop 11, the cartridge will be prevented from escaping rearwardly out of the magazine; this action is shown in Fig. 30.

In Figs. 7, 7ª and 7ᵇ (also, in Fig. 21), the cartridge guide surfaces 8ʳ occupy a position over the path of the head of a cartridge about to be, or being, withdrawn from the barrel. It will be noted that in Figs. 7, 17, 21 and 22, the rearward parts 8ʳ' of said cartridge guiding surfaces are located in such a position that the cartridge-shell on being withdrawn from the barrel-chamber, moves backward under these guiding surfaces. The extractor hook 9ª, which is carried with the breech-bolt, is shown in Fig. 7 grasping the rim $y'$ of the cartridge case $y$ which has now been moved rearwardly until the front end of the cartridge case is free of the barrel chamber, and is now in position to be ejected downward past the magazine entrance which is guarded by the members 10 and 11. It will be noted in Fig. 9 that the cam surfaces or actuation faces, 8ᵈ, of the carrier are now in position to be operated upon by the coacting cam surfaces or actuator faces, 6ᶜ of the slide,—see, also, Fig. 21. Further rearward movement of the slide will "cam" or actuate the rear end 8ᵈ of the carrier upward, and consequently force the front end 8ᵇ of the carrier downward to throw the cartridge downwardly out of the receiver,—see Fig. 22.

In Figs. 8 and 18, it will be noted that the rear cam 8ᵈ on the carrier 8 has been moved completely upward by the cam 6ᶜ on the slide 6, and that the back face 6ᴅ (Fig. 8) of the slide 6 is against the stop surface 2ʰ of the receiver. This is the position at the end of the backward operating stroke, or retraction stroke, of the mechanism; the front end of the carrier is in its downward or complete ejecting position which is also the cartridge-receiving position. At this time the action bar 20, with its notch 20ᵇ, has been moved backward until said notch is opposite the upper end 10ᵉ of the bolt stop or latch 10. The spring 10ᵈ of the bolt stop (Fig. 6ª) is now free to move the top 10ᵉ of the bolt stop outward to occupy the notch 20ᵇ in the action bar 20,—see Figs. 28ª and 31. Thus the restriction at 10ª (Figs. 6ª, 29, 30) against the rising of the head of the cartridge in the magazine, is now removed, and the rearward thrust of the magazine spring 13, acting through the agency of the follower 12,—or through the agency of other cartridges in the magazine,—forces the rear-most cartridge rearwardly; the head of the rear-most cartridge in moving back being free to ride rearwardly and upwardly upon the inclined stop surface 11ª of the cartridge stop 11, as already explained. The cartridge just fed from the magazine now rests over and is supported by the carrier, or carrier-arms, as shown at $y$, in Figs. 8, 18. As this cartridge moves rearward (Fig. 31ᵇ), on passing entirely out of the magazine, it allows the front end 11ª of the cartridge stop 11 to move inward under the influence of the cartridge stop spring 11ᶜ.

The next cartridge moving rearward under the influence of the magazine spring, is thus prevented from leaving the magazine. As this next cartridge moves rearward to strike the cartridge stop, its head comes against the inclined surface 10ᵉ of the bolt-stop 10, and thus operates to move the lower end of the bolt-stop downward, and outward again to the position shown in Figs. 6ª and 29. This rocking of the bolt-stop moves the top 10ᶜ of the bolt-stop inward, thereby removing the blocking means from the notch 20ᵇ in the action bar. It follows, therefore, that the action bar 20 and slide 6 are now free to be moved forward, for continuing the operation of the mechanism. It will be noted that said slide and the action bar will be locked in the open or rearward position (Fig. 8) by the said member 10 operating as an action latch until a cartridge has issued completely from the magazine, at which time the next cartridge (or in the absence of that, the "follower") is moved rearward by the magazine spring to withdraw the said latch from its locking engagement (Fig. 31) with the action bar. Thus, until a cartridge has been fed completely and correctly from the magazine, the breech action is blocked in the open position.

The rearward cartridge in the magazine is normally held in the magazine by contact with the front end 11ᵉ of the cartridge stop, Fig. 29ᶜ, until the slide 6 again reaches its forward position, as shown in Fig. 5. At this time, an actuator-face at 6ʰ, (Fig. 29ᶜ) on one side of the right front end of the slide 6 engages the surface 11ᵈ,—which is shown inclined to the movement of the slide,—and thus moves the forward end of the cartridge stop 11 outward until it is in the position shown in Fig. 30ª. This allows the rear cartridge in the magazine to move rearwardly from the position in Fig. 29ᶜ to the position in Fig. 30ª, and thus completes the cycle of movements of the magazine control device, or cartridge-detaining (container) means.

The front or upper cartridge-guiding surfaces, 8ᶜ, Figs. 19, 19ª, of the projecting part 8ᵇ of the carrier supports the body of the cartridge, and in the rear thereof the cartridge guide surfaces 8ª support the head of the cartridge. As shown in Figs. 9 and 19, the parallel part 6ᶠ of the slide 6 moves forward under the surface 8ᶠ of the carrier, thereby retaining the carrier in this supporting or loading-in position while the cartridge is being driven into the barrel chamber by the forwardly advancing breech-bolt. It will be noted that the said guide surfaces 8ᶜ at the front end of the carrier (Fig. 19ª) stand slightly in the path of the head or rim y' of the cartridge being driven into the chamber. In practice, said rim y' may usually be pushed over said projecting part 8ᵇ, but whenever it is deemed desirable a clearance way, 8ᵍ, may be formed or provided in the carrier for that purpose. The amount of this relief or clearance at 8ᵍ, may be quite small, or only sufficient to allow the carrier to move downwardly slightly over the surface 6ᶠ of the slide, just before the rim of the cartridge in its forward movement reaches the guide surfaces at 8ᵇ on the front end of the carrier. The effect of this relief or clearance is to allow the front end of the carrier to be slightly depressed to permit the forward passage of the head or rim of the cartridge over the guide surfaces without any impingement thereon or frictional resistance therefrom. This relief device, however, need not always be employed.

After the cartridge has been driven forward and off of the carrier, the curved surface 8ʰ of the carrier is acted upon by the surfaces 6ᵉ and 6ᶠ of the forwardly moving slide to throw the front end of the carrier upward to its shell-receiving position. The parallel surface 6ᶠ of the slide now moves under the surface 8ʲ of the carrier (Fig. 20) and holds it in this upward position during the completion of the forward movement of the slide, (see Fig. 10). The slide in completing its forward movement, by reason of the helical grooves in the portion 6ª thereof acting upon the helical ribs 7ᵇ 7ᵇ' of the breech-bolt, now rotates the breech-bolt into its locked position, and the slide comes to the position shown in Fig. 5. At this time, the slide 6 strikes the surface 11ᵈ of the cartridge stop 11, and swings the front of this cartridge stop outward so that the cartridge moves back from the stop base 11ᵇ (Fig. 29ᶜ) to the slightly inclined and more rearward stop surface 11ª, (Fig. 30ª).

The carrier 8 being also a shell-ejector member, and being pivotally supported rearwardly in the frame, it is thus arranged for upward and downward swinging movements and is thereby coöperative not only with the breech action but also with both the barrel and the magazine. The breech action being provided with actuating means suitable for effecting said swinging movements of the carrier, or ejector member, this member is thus actuatable to an uplifted shell-receiving position, (Figs. 6, 7, 21), relatively to the barrel, preferably on a forward movement of the breech action, but prior to the withdrawal of a fired shell from the barrel. These arrangements provide (as already indicated) for the withdrawal of the shell to a position under the said uplifted carrier or member during a rearward movement of the breech action, and for thus drawing back the shell until the head-end thereof (Fig. 21) strikes the abutment 8ᵗ, which thus becomes a shell-stop face in position and arranged for coacting with the shell-withdrawing means to turn the withdrawn shell downwardly by a swinging movement in the direction of the downward swinging movement of the combined shell-ejector and carrier. This swinging movement of the shell normally begins, of course, immediately following the time when the hook 9ª of the extractor passes rearwardly of the face or ejector abutment 8ᵗ of the carrier.

Thus when the extractor hook 9ª (Fig. 22) passes to the rearward of the said shell-stop face 8ᵗ, the forward end of the shell, y, (at the right-hand in Fig. 22) is swung downwardly as indicated by the dotted position at y, and immediately following that step of the operation, the carrier-actuating means appurtenant to the breech action, (in this instance the cam-face 6ᶜ) operates to inaugurate a downward movement of the said carrier, or ejector-member, and thereby assist in ejecting the shell point-first downwardly through the bottom-opening 2ᵍ (Fig. 7) of the receiver. In this operation, therefore, when performed in the normal manner here explained, the shell and carrier-ejector may be said to have,—for a time,—simultaneous rotative or turning movements in the said directions and in the same plane, with relation to the receiver or frame. During the earlier part of the ejection operation, the shell engages with (is grasped by) the extractor-hook 9ª, in a relatively positive manner, and turns thereon as upon a pivot; and during such movement the shell acquires normally a velocity and rotative momentum which, an instant later, tend forcibly to throw out the shell in advance of the carrier-ejector reaching the cartridge-receiving position thereof, shown in Fig. 18. By these means the shell usually will be turned to or beyond a vertical position (not shown) considerably in advance of the said carrier-ejector reaching a position where a fresh cartridge could be delivered thereon from the magazine, thereby safeguarding the mechanism against a possible interference of a fresh cartridge with a partially ejected shell.

A further result, among others, which is obtained by the described excess rearward stroke of the slide 6 relatively to the bolt head 7, will be evident from a comparison of Figs. 5, 6, 7, 8, in connection with the means herein set forth for actuating the carrier from said slide. For instance, when retracted the slide is located so far rearwardly in the frame, as to provide for relatively long carrier arms, and hence for the carrier-pivot 8ª to be located so far rearwardly of the barrel as to permit the carrier to have a relatively small angular (or swinging) movement; this is shown by the angular movement or stroke as indicated in Fig. 21. The angular movement from the cartridge-receiving position Fig. 18 to the loading position, Fig. 19, is shown by the angle 26 in Fig. 39. In a similar manner, the angle 26ª (Fig. 39) indicates the upward swing of the carrier from the loading-in position, Fig. 19, to the shell-receiving position Fig. 20. In said diagram, Fig. 39, the carrier arm, 8, is represented by a single dash-line drawn tangential to the small circle around the axis 8ª. By thus providing for such a small angular stroke of the carrier, the inclination of the carrier faces 8ˢ, is much less than would be required if the carrier had said pivot 8ª thereof located farther forward than herein indicated; these features, in turn, permit the several carrier-actuating cam-faces, (already described) of the slide 6 to be constructed for operating the coacting faces through a less distance than would otherwise normally be required.

A further feature of the carrier-mechanism in the described preferred form thereof, is especially illustrated in the diagram Fig. 39. In this view, a meridian line 27 is shown located at a height about mid-way between the lines 27ª, 27ᵇ, representing the lower and upper positions of the carrier relatively to the cartridge-shell, in Figs. 19 and 20, respectively. The axis, 8ª, of the carrier is located above said line 27ª, by a distance 26ᵇ, so that on the swinging movements of the carrier to its several waiting positions, (Figs. 18, 19, 20), the said guide-faces 8ˢ, 8ʳ', will have in each said position, a different and a proper relation to said meridian-line. A principal object thus accomplished is to locate said guide-face 8ˢ longitudinally of the barrel while the carrier is waiting in the loading-in position Figs. 9 and 19, and also to bring the guide-face 8ʳ' to a corresponding parallelism while the carrier is waiting in the pre-ejection position Figs. 7 and 21. For further illustrating the relation of Fig. 39 to the views Figs. 18 to 22, the cartridge shell, y, is shown in this diagram in three positions as stated. It will be noted that the angle 26ᶜ, subtended by the faces 8ˢ and 8ʳ', corresponds with the said angle 26ª which represents the angular movement of the carrier from its position in Fig. 19 to its position in Fig. 20.

The location of a slide-releaser, or unlocking lever, as 22, in such a way as to be accessible within the rearward part of the frame-opening 2ᵍ, furnishes a convenient means for operating said latch or lock, and at the same time protects said releaser by the adjacent walls of the frame. Also, in combination with the breech action and the two-arm carrier, said releaser-lever 22 has the operating end 22ᵇ thereof located between and below those arms, so that even when the carrier is lowered, (Fig. 8), said lever end is still readily accessible to the finger. This arrangement enables the operator to try the operativeness of the lever 22, even when the breech action is partially or fully retracted, since, in practice, said lever should have some,—a slight,—play as between the adjacent parts above and below, so that the operator may at any time examine, (by such a manual inspection as here indicated) whether or not the lever is in a proper operating condition. This accessibility of the lever-end 22ᵇ is further secured, or maintained, by the inclined position of the carrier when in cartridge-receiving position (Figs. 8, 18) whereby the shell, as $y$, (Fig. 8), is guided rearwardly and upwardly to a position where it does not interfere with a free access at all times to the lever.

From the firing position, Fig. 5, the shell $y$ is drawn directly rearward by the extractor, until the shell reaches the position for ejection, Fig. 21, at which time the head-flange $y'$, (see cross-sectional views Figs. 7ᵃ, 7ᵇ), rests under the guide-faces, 8ʳ', while the carrier-ends 8ᵇ, are in a more elevated position as shown in Fig. 7ᵃ. During this retraction of the shell out of the barrel, the extractor hook 9ᵃ by its engagement underneath the flange $y'$, holds the shell in alinement with the barrel, and immediately after the shell is fully extracted (Fig. 22), draws said flange $y'$ against a shoulder 8ᵗ, located on the inside and at or near the lower side (edge) of the carrier-arm, so that during a further retraction of the breech-bolt 7 and hook 9ᵃ, said shoulder, or ejection-stop 8ᵗ, coacts with the hook 9ᵃ to suddenly swing the shell downwardly, from the extraction-position in Fig. 21, through an ejection movement of which one stage or position is indicated by dotted lines at $y$, Fig. 22. Soon after this swinging, ejection movement of the shell is inaugurated, the slide-face 6ᶜ comes into engagement and coaction with the arm-face 8ᵈ, (see Figs. 22 and 18) and thus begins a downward swinging movement of the carrier-arm, whereby the flange-engaging face 8ʳ' thereof follows down after (and usually against) the moving shell and thereby assists in the complete and rapid ejection thereof during the retraction of the bolt-mechanism from position Fig. 22 to position Fig. 18.

In some exceptional instances it may accidentally happen by reason of a defective cartridge or otherwise, that when the shell is fully extracted, (Figs. 7, 17, 21), the shell-flange $y'$ may become disengaged from and stand forward of the hook 9ᵃ (as indicated in Fig. 9,) and if, at such a time, the firearm should be in an up-side-down position and the mechanism be slowly operated, the shell might not be fully ejected, but might remain in, or fall back into the chamber space of the frame. In such an instance, the outwardly swinging carrier-arms (see the dotted position of carrier 8, in Fig. 21) will naturally engage the shell and carry it out of said chamber-space to about the relative position shown at $y^4$, Fig. 21, where this shell is located on the opposite (and normally the lower) side of the carrier-arms as compared with a fresh cartridge then just issued from the magazine as in Fig. 18. Thus by means of the special and additional features here set forth which are supplemental to the principal elements and combinations, certain advantages and peculiar modes of action are secured; but it is to be understood that the said specific features are not essential to the mechanism as regards the principal functions thereof.

In Figs. 38, 38ᵃ and 38ᵇ, I have illustrated a feature of the preferred arrangement and mode of action of a carrier-actuating means whereby the carrier may be actuated with an accelerating movement from the mid-position thereof shown in Fig. 19, to the upper positions thereof shown in said Fig. 20. This actuation-means or arrangement is here shown so organized as to accomplish the important object of imparting to the said carrier, an upward, or up-stroke movement through a relatively long distance from and during a relatively short portion of the forward movement of the member 6 of the breech action; and this carrier movement is also inaugurated with a minimum of shock and resistance as between the carrier and the breech action. As one improved means for these purposes, and as a means for securing in such a manner a relatively large amount of movement of the carrier 8 as compared with the corresponding movement of the slide 6 operating as a carrier-actuator, these two members may be provided with the described pair of coacting cam-faces designated by 6ᵉ and 8ʰ, respectively. The actuator cam-face 6ᵉ is here shown of a convex form and of a relatively sharp curvature, and the coacting, or actuated cam-face 8ʰ is shown of a concave and of a relatively longer or less sharp curvature, while both of said cam-faces are shown located in a geometric plane which is located longitudinally of the mechanism, and, in this instance, also located in a vertical plane which may be said to be parallel to the plane-of-movement of the carrier itself.

When said carrier-actuation means is arranged as in Figs. 38, 38ᵃ, 38ᵇ, the forward movement of the actuator-face 6ᵉ may be indicated by and on a regular scale, S, and the up-stroke of the carrier by and on the variable scale T, and the resultant and rapid acceleration of the carrier itself is further indicated by the progressive change in the comparative positions of a line, as $z^1$, $z^2$, $z^3$, which is tangential in each said view to the cam-faces at the point of contact thereof. For the purpose of aiding these comparisons, meridian lines are drawn from said figures to the scale T, and parallel with the line of movement of the block 6. On said scale S, the successive positions of slide 6 are shown by the dots $s^1$, $s^2$, $s^3$, which are spaced apart uniformly. On the scale T, the corresponding positions, respectively, are indicated by the dots, $t^1$, $t^2$, $t^3$, which are variably spaced apart. And on the bearing faces $6^e$, $8^h$, the corresponding contact-points are indicated in the same well-known manner. Thus the carrier 8 is normally shifted in an easy and rapid manner from its position in Fig. 19 to its position in Fig. 20, during a relatively very short portion of the forward stroke of the slide 6, and prior to the firing mechanism becoming operable (as already described) through the forward advance of said slide,—also, prior to a complete locking of the bolt-head, 7, with the frame member 2.

In Figs. 18 and 19, the cartridge $y$ is shown with the head-flange $y'$ thereof resting on the guide-faces, $8^{s'}$, while the shell-tube rests on the carrier-end surfaces $8^e$; in Fig. 19, the carrier is shown at such an elevation as to guide the cartridge into the barrel while the said shell-tube thereof slides forwardly upon said carrier-ends $8^b$, $8^b$, (Fig. $19^a$). Under these conditions the head-flange $y'$ will ultimately, during the loading-in operation, come against the rearward inclined ends of said carrier-ends $8^b$, and thus normally require a lifting of the cartridge head which, in some instances, may be prevented by the fit of the shell-tube in the barrel, or require the carrier to be resiliently upheld, or to be retracted downwardly by a small amount in order to allow the flange $y'$ to freely pass the carrier-ends $8^b$. Also, in some cases, the carrier may be held in a slightly lower loading-in position, while the point (forward end) of the cartridge is rounded or beveled,—or in lieu thereof, the barrel may be slightly enlarged (not shown) for the same purpose. However, to secure the best mode of action, I prefer to employ means whereby the carrier will be permitted to temporarily descend for a slight but sufficient distance to clear the head-flange, this relieving action taking place after the point of the shell-tube has been entered well into the bore of the barrel. These features are illustrated in Fig. $33^a$, where the cartridge (shown in dot and dash lines) is supposed to be partially loaded-in (as in Fig. $32^b$) while a depression at $8^e$ in the carrier-arm coacting with the face $6^f$ of the block 6, has allowed the carrier-arm to be lowered and thus lower the carrier-ends $8^b$ away from the shell-tube $y$; this is also indicated in the diagram Fig. $33^b$, as hereinafter more fully explained.

For preventing the spreading apart of the shell-engaging arm-ends $8^b$, $8^b$ of the carrier, suitably located oppositely-disposed guide-surfaces, as $2^r$, $2^r$, Figs. $7^a$, $8^a$,—may be provided, and these may be conveniently formed on the frame member 2, and thus form the inner surfaces, in part, of the side walls thereof. When the carrier is constituted of two separated members each complemental of the other and arranged for concurrent and identical operation in accordance with the arrangement herein adopted in the principal views, the said guide-surfaces, $2^r$, $2^r$, may form one means, and in some instances the chief means, for holding said arm-ends against an undue separation or spreading apart. But in other instances, the carrier may have an integral construction, and the side members thereof may be so rigidly connected, and be in themselves of such stiffness, that the said guide-surfaces, $2^r$, $2^r$, may be omitted either wholly or in part. Such a rigid connection is indicated by the cross-bar $8^p$, Figs. 34, 35. When this or an analogous construction is adopted, the guide-surfaces $2^r$, $2^r$, may be omitted; or, if provided, may be so located and arranged as normally not to contact with the carrier arms except in cases where the shells may be deformed or become jammed,—in such a case, said guides will operate, of course, as a preventive against an undue or accidental overspreading of said arms, and will thus tend to safeguard the firearm against accident. When thus made integral, the carrier (see Fig. 34) may be pivotally held in place by some suitable pivot-screws, as $2^t$, $2^t$, (here shown of a well known kind), which may be threaded into the frame receiver walls and may have suitable points, as $2^{t'}$, which enter bearings in the carrier and thus serve as journals therefor, as will now be clearly understood.

In the diagram Fig. 37, which illustrates the relation of a cartridge shell at successive stages in the operation, or cycle of movement, of the carrier, only the rib portions $8^n$, $8^n$, of the two carrier-arms, 8, 8, are indicated. Also, in this view, said arms are shown in an approximate form only. The three successive positions (which correspond respectively with the positions of said arms in Fig. 18, 19, and 20), are indicated at and by $8^{n18}$, $8^{n19}$, and $8^{n20}$, respectively. In the lower position, $8^{n18}$, said carrier arms are located below the position in which the cartridge, (here indicated by circle $y^8$), issues from the magazine, 5,—see Fig. 8. From said lower position, the carrier next moves up through a transfer stroke which is the first stage of the two-stage upward-movement, and brings said arms to the mid-way position $8^{n19}$. At this time, the cartridge, (here indicated by the circle $y^9$), is in the upper or loading-position thereof, and substantially in alinement with the barrel, (see Figs. 19, $32^a$), while the carrier itself is in an intermediate position, which is also sometimes designated as the loading-position thereof.

The cartridge being now loaded into the cartridge-chamber of the barrel, see Fig. $32^b$,—the carrier arms 8, 8, may be moved through the second stage of the upward stroke thereof, and be thereby brought to the upper (and one extreme) position $8^{n20}$, just above the circle $y^9$ which here indicates the position of the shell of a fired cartridge, when this shell is being retracted out of the barrel, (see Figs. 7, 21, 32$^d$), preparatory to the ejection thereof. On the complete withdrawal of the spent shell, (see Fig. 21), a quick movement of the carrier from the said upper-position through the full stroke to said lower position 8$^{n18}$, see Figs. 21, 22), normally drives the extracted shell downwardly to the position indicated by the circle $y^4$, Fig. 37, where the shell may be said to be fully ejected. Thus the carrier arms are again brought to a position below a cartridge issuing from the magazine, ready for a repetition of the described cycle of operations.

The diagram, Fig. 37, also illustrates one of the advantages peculiar to certain features of the carrier construction herein shown and described, whereby the middle portion (widthwise thereof) as heretofore usually arranged and employed, is here omitted. One result of this feature is that the shell of a cartridge when located just above and on the carrier (as at circles $y^6$ and $y^8$) is in a position which overlaps the position, (indicated by the circle $y^4$), of a shell located just below the carrier; this arrangement is indicated, also, by the intersection of said circles $y^4$ and $y^8$.' This construction and arrangement, permits the described upper or second stage of the carrier-stroke to be of a minimum length, and which, in practice, may even be less than the diameter of the shell; also, the full-stroke will be correspondingly minimized. Because of these relatively short strokes of the carrier, and especially because of the shortness of the stroke from the loading-position up to the firing-position,—the carrier-actuating devices, which are coöperative as described between the slide 6 and the carrier, may have a shorter stroke or working movement and may occupy a much smaller space than might otherwise be required, thereby securing, directly and indirectly, important advantages in the construction and operation of the mechanism.

Under some conditions, the carrier, 8, may not operate to actually or positively effect the complete delivery or expulsion of the empty shell downwardly through the said bottom-opening 2$^g$ for the operation may be sometimes performed by gravity alone, especially if the mechanism be operated slowly, and if this be done when the firearm is in the more usual position in which the said ejection opening is at the lower side of the receiver or frame 2. Should the firearm, however, be in other positions, or the shell be defective and become jammed, or should the mechanism be operated with a considerable rapidity, so that the shell will not fall out quickly enough by the action of gravity alone, then the carrier 8 becomes operative, as shown by dotted lines in Fig. 21, as the ejector whereby to directly and forcibly expel the shell, $y^4$, to the position there indicated.

The arrangement of the extractor at the lower side of the rearwardly-moving breech-bolt, (Fig. 7$^b$), for securing the described coaction with the shell-guiding faces, or guide-ways, as 8$^r$, 8$^{r'}$, on the under side of a carrier which is a combined elevator and ejector (when this device is in the elevated position thereof), produces in the mechanism a peculiar combination whereby the shell during the latter portion of the extraction movement thereof is grasped or engaged between opposing instrumentalities, only one of which is appurtenant to the breech action, and which acting together securely control the shell until this is fully withdrawn from the barrel. In this operation said under-side guide-surfaces 8$^{r'}$, of the carrier arms (also see Fig. 7) retain the shell in engagement with the hook 9$^a$ and later operate as ejection means by a continued but modified mode of action. Also, as clearly shown in Fig. 7$^b$, the hook 9$^a$ being mid-way of the firearm in a lateral or widthwise direction, forms with those two guideways 8$^{r'}$, a triangular arrangement whereby the said shell-control is accomplished in a most effective manner. In this preferred arrangement, also, a further result is to bring the initially acting ejection-faces, or shoulders, 8$^t$, 8$^t$, to a level, or position indicated by a line $v$, considerably below the top of the shell $y$, so that the resultant initial movement of the shell is effected by means of a relatively short leverage action corresponding to the distance $v^2$ (less than the diameter of the shell), thereby producing a rapid initial movement of the shell and imparting thereto a correspondingly large amount of momentum; in many instances, in practice, this force will be sufficient to carry the empty shell out of the firearm in advance of a complete retraction of the carrier to the cartridge-receiving position thereof.

For more fully exhibiting the relative movements of the projecting forward-end portions, 8$^b$, of the carrier and of the face of the breech-bolt 7, these parts are indicated in the five fragmentary views, Figs. 32 to 32$^d$, in five successive relative positions, respectively. A given point is indicated on the bolt-face by a dot, $f$, while a similar dot, $r$, indicates a point on the carrier-end 8$^b$. In the illustrative diagram Fig. 33, the movements of the bolt-face relatively to the receiver 2, are disregarded, and the successive positions of the carrier-point $r$ relatively to said face-point $f$, are arranged in a circuit in which the said successive carrier-positions are approximately indicated by the point-positions $r^2$ to $r^7$, of the point $r$, corresponding to said views Figs. 32 to 32ᵈ, respectively. Thus, with relation to the breech-bolt head 7, the carrier-end 8ᵇ may be considered, as regards certain features, as being the main component feature or element of the carrier with relation to the cartridge and shell. In the operation of the mechanism, the carrier-end, as represented by the point r, (see Fig. 33), makes a complete circuit (as seen in side view of the carrier) around the bolt-head 7, as represented by said point f thereon. In this circuit the point r in its successive positions is combined with successive numerals designating such positions, respectively, from 2 to 7.

In this circuit, at the forward end thereof, the carrier-point f, (that is, the carrier-end, or "carrier" proper, represented by said point,) makes a single-stage stroke downwardly from the point r⁷ to the cartridge-receiving position at r² (see Fig. 32) and then immediately rises to the line or height of the loading-in position (see Fig. 32ᵃ) which is retained from the point r³ the more rearward point r⁴ (see Fig. 32ᵇ) where the carrier-path turns upwardly to the reserve or shell-receiving position, (see Fig. 32ᶜ), which, beginning at r⁵, is maintained forwardly past the intermediate point r⁶ (see Fig. 32ᵈ), to the point r⁷, where the carrier is again in position (as in Figs. 7 and 21) ready to begin the said downward ejection stroke. Said position of the carrier in Fig. 32ᵈ, is also sometimes designated as the pre-ejection position. To facilitate comparison of positions, lines are drawn between the point r positions in Fig. 33, to correspond with similar lines in Figs. 32 to 32ᵈ, respectively, as follows:—line k², from f to r² (Fig. 32); line k³, from f to r³, (Fig. 32ᵃ); line k⁴, from f to r⁴, (Fig. 32ᵇ); line k⁵, from f to r⁵, (Fig. 32ᶜ); line k⁶, from f to r⁶, (Fig. 32ᵈ); line k⁷, the path of point r from position r⁷ to position r².

In the diagram Fig. 33, the single-stage downward stroke of the carrier represented by said line k⁷, is followed by an intermittent or two-stage upward movement comprising two strokes of which the first is represented by the path-line from r² to r³, and the second, by the path-line from r⁴ to r⁵. In some instances the horizontal line from r³ to r⁴ may have a down-curved portion about as shown at k⁸, in the diagram Fig. 33ᵇ, for indicating a short descending movement imparted to the carrier at a time when the cartridge has been pushed about one-half (or slightly more) of its length into the barrel. This carrier-movement may be produced, in practice, by providing the carrier arm 8 with a face at 8ᵉ (see and compare Figs. 19, 33ᵃ, 36ᵃ) arranged for passing off from the supporting surface 6ᶠ of the slide,— during the forward movement of the slide,— as shown in said Fig. 33ᵃ. By this means the carrier-end 8ᵇ may be allowed to drop to a position r⁴′, out of line of the head-flange y′ of the then forwardly-moving cartridge y. Thus, Fig. 33ᵇ, (which is drawn in alinement with and below Fig. 33 to facilitate comparison therewith), illustrates a stage of the operation slightly later than is shown in Figs. 19 and 32ᵃ. This particular feature of the carrier mechanism, however, may be omitted in some instances, since in practice, the head-flange y′, usually may be readily pushed over the carrier face 8ᶜ, (Fig. 19ᵃ), especially if the shell of the cartridge is slightly tapering (and, hence, loosely fitting in the barrel), which is, of course, a preferable form.

When the single-arm form of carrier shall be employed, this carrier may be located and arranged either on the right-hand or left-hand of the receiver, that is, in place of the arm 8 or the arm 8′, respectively, in Fig. 34. In Figs. 36 to 36ᶜ, the single-arm carrier 8 is arranged in the said left-hand position, in order chiefly to bring the view of the inside of said arm in Fig. 36ᵃ, into correspondence with the views in Figs. 18 to 22, inclusive, so that the description of the operations as set forth with relation to said views, shall also apply to the similar arm as shown in Figs. 36 to 36ᶜ, inclusive. In this left-hand arrangement, however, it will usually be convenient to place the action-bar 20 on the right-hand of the receiver as shown in Fig. 36ᵇ; this will require, of course, that in practice the members 10 and 11 of the magazine mechanism shall be correspondingly reversed in arrangement, these parts, obviously, may be made and arranged either left-hand or right-hand, with equal facility. When this single-arm carrier is adopted, the point, or end-portion, as 8ᵇ′, should usually be made to project inwardly, as in Figs. 36, 36ᵇ, somewhat farther than is required of the end portions, as 8ᵇ, (Figs. 16, 19ᵃ,) of the two-arm form of carrier. For use with the carrier arrangement of Figs. 36 to 36ᶜ, the carrier-actuating means of the breech action may be adjusted (by selection or construction) to operate the carrier according to the diagram in Fig. 33, or in Fig. 33ᵇ, as may be preferred. Also, the cartridge-guiding surfaces of both carrier and receiver should be arranged (see Figs. 36ᵇ, 36ᶜ) so that no wedging action will result, of the cartridge between said surfaces and members.

For inserting cartridges into the magazine, the breech-action should be slightly advanced from the fully-retracted position Fig. 8, nearly to the position shown in Figs. 9, 19, where the carrier arms, 8, are shown elevated to approximately the loading position, while more than a full cartridge-length of clear space exists in the mechanism chamber between the forward end of the block 6 and the rearward end of the magazine tube 5. The cartridges may now be inserted through the bottom opening 2ᵍ, and then be readily pushed forward into the magazine; in this operation the spring-actuated detainer 11 is, of course, retracted by the pressure of the cartridge shell itself. These operations will be more clearly understood by a comparison of Figs. 29 to 31ᵃ, already described.

A cartridge may be inserted by hand into the barrel in two ways. Assuming that the breech action is completely retracted (Fig. 8) and the magazine empty, one way is for the user to press the lower side of the bolt stop, or slide lock, 10, outwardly, which moves the top part 10ᵉ of the slide lock inwardly and out of engagement with the notch 20ᵇ in the action bar 20, (Fig. 30). This allows the action bar 20 and the breech action to be moved slightly forward so that the carrier 8 may be manually moved upward to its pre-ejection position (Fig. 21) at the rear of the barrel chamber. A single cartridge may now be readily introduced into the receiver chamber by hand, and then pushed forwardly into the barrel, either by hand, or by operating the mechanism.

A preferable way, however, of introducing a cartridge by hand into the barrel-chamber, is to perform this operation with the breech mechanism completely open and the carrier in the downward position, as in Fig. 8. The front end of the loaded cartridge, as y⁸, is pushed upward through the bottom slot or opening, 2ᵍ, in the receiver, and between the two carrier-arms 8, and back of the relatively short cartridge guide surfaces 8ˢ on the forward ends of the carrier-arms. The cartridge is next moved upward and forward until the front end thereof is contiguous to the rear end of the barrel, as shown by dotted lines at y⁸, Fig. 8, the lower, or rim end, y', of the cartridge slanting upwardly and to the rear. The rim or head-flange y' of the cartridge y⁸ is now swung upward through the two inclined slots 8ᵐ, in the carrier which permit the passage of the rim or head of the cartridge in the proper direction. The cartridge is now free to be introduced into the barrel-chamber and the breech action actuated to the firing position, in the manner already explained.

From the foregoing description as illustrated, it will now be evident that in the preferred construction of the carrier 8 and of the means for operating the same, which is herein illustrated, the bolt 7 during the forward movement thereof passes freely between the two carrier-arms 8, 8, so that the mechanism does not require,—and in the form illustrated, does not have,—any means whereby to permit the bolt to pass between the carrier arms in its forward movement, since the organization of the members, as herein shown, may of itself provide for the described mode of operation without any need for employing such a means. And similarly, and for the same reasons, the mechanism requires no element or device which constitutes a means by which a breech-block or breech-bolt passes between said arms in moving forward, or in placing the cartridge in the barrel-chamber; nor are the receiver walls made recessed to permit passage of the head of a breech-block or breech-bolt between the front ends of the carrier-arms during the forward movement of the base-member.

It will now be seen that in the complete firearm, when all the details are organized and arranged as illustrated, the combination of receiver, barrel, magazine and reciprocatable breech action, is coöperative with a carrier which is in position and arranged for working-strokes to and from a lower position below a cartridge issuing from the magazine and to and from an upper position above a cartridge-shell issuing from the barrel; and that in the preferred form thereof, the carrier-actuating means consists of a series of coacting cam-pairs comprising six actuation faces arranged three of them on the carrier and three on the breech action or on the base-member thereof, said cam-pairs being also in position and arranged two of them for effecting successive upward movements of the carrier, and one of them for effecting a one-stage down stroke of the carrier during the rearward stroke of the breech action and subsequent to the withdrawal of a shell from the barrel-chamber; and that said cam-pair for effecting the second said upward movement comprises a forwardly-facing convex actuator-face on the breech action and a concave face of a larger curvature on the carrier, and arranged for thereby imparting to the carrier an accelerated upward movement relatively to and during the forward movement of the breech action.

The hook 9ᵃ of the extractor being located at the underside of the forward end of the breech-bolt, 7, and the carrier being pivotally supported near the rearward end thereof, and having arms located one on either side of the breech-bolt and having a shell-guiding or engaging face on the lower side of each of said arms, when the carrier-actuating means locates said carrier-arm faces above a cartridge-shell, (that is, above the path of a shell being drawn out of the barrel), prior to the extraction of the shell from the barrel, the rearward moving breech-bolt and extractor hook while extracting a shell from the barrel, will then draw the shell under the carrier-arms while these arms are in the described elevated position, after which the said actuating means will operate the carrier,—on the withdrawal of a shell from the barrel,—toward the shell-receiving position thereof relatively to the magazine.

The shell-stop faces, 8ᵗ, constitute a shell-stopping means appurtenant to the combined carrier-ejector, and are located on the ejector-members, 8, in position relatively to the barrel for coacting with the shell-retracting means to swing downwardly and so eject the shell instantly upon the complete withdrawal thereof from the barrel. In these operations, the hook 9ᵃ being carried by an extractor member, 9, having (as herein shown) the form of a spring, is thereby yieldingly upheld and is slightly depressible during the initial or earlier part of the described shell-ejecting operation. For these purposes, the described ejector-actuating means appurtenant to the breech action, are arranged for inaugurating the ejection stroke of the ejection-member, 8, in proper timing with the withdrawal of the shell from the barrel, and during the rearward movement of the breech action. Preparatory to the performance of these functions, the said ejector-member is actuated, as already explained, to said shell-receiving position at a time in advance of (prior to) said shell-withdrawing operation, and subsequently to an operation in which said ejector-member is employed as a carrier for transferring a fresh cartridge (as received from the magazine) to the described loading-in position. During the earlier part of the shell-retraction (Fig. 7) the head-flange, y', of the shell, y, is held down into engagement with the hook 9ᵃ, by a shell-guiding surface at 2ᵛ', in the receiver 2; in the present instance said surface or guide-face 2ᵛ' is conveniently constituted of the lower face of the rib 2ᵛ, (see Figs. 7, 7ᵃ, 7ᵇ), which is located just above the extraction-position of the shell, and thus normally prevents the shell from escaping from its engagement with said hook 9ᵃ, during the withdrawal of the shell from the barrel.

During any movement vertically of the hook 9ᵃ relatively to the bolt-head 7, the extractor 9 is held against longitudinal movement relatively to said head, 7, by means of the projection 9ᵇ of said member 9 engaging in the groove 7ʰ of the bolt-head, as will be evident from a comparison of Figs. 11, 23, 26. By means, also, of this interlocking engagement of said members 7 and 9, the latter member is maintained in proper relation with the member 7 during the movements thereof longitudinally of the base-member of the breech action; also, the rearward hook-ends 9ᶜ and 9ᵈ of the extractor coöperate (by an analogous engagement) with the firing-pin member 17, for retaining the same in a proper position during the said operations of the breech-bolt, while the member 9 slides in the slot or guideway 6ᵃ formed therefor in the slide 6, below the bolt-stem 7ᵃ, as indicated in Figs. 12 to 14 and Fig. 23ᵇ.

As regards some of the subjects-matter herein defined, the devices appurtenant to the magazine and which are operable and co-operative for detaining and releasing a cartridge, may be considered as constituting one element of combination, and may be designated "a cartridge-detainer", or as "cartridge-detaining means", since the specific construction and arrangement of such devices for delivering at the proper time, a cartridge from the magazine-tube to the carrier, is evidently immaterial to the principal functions of the combined loading, firing and shell-ejecting mechanism. In the form thereof herein illustrated, the cartridge detainer,—considered as a whole,—is of a composite character and comprises two mechanically separate devices one of which is a stop device, as 11, while the other device, as 10, is a detainer (at certain times) and also a releaser, which, as elsewhere herein more fully explained, operates to shift the cartridge head out of engagement with the said stop device. Thus while "a stop device" is coöperative with the cartridge and the breech action, the actual delivery of a cartridge out of the magazine is not effected by operating any stop device, but is accomplished by a bodily movement of a releaser that is by itself neither a stop nor a complete detainer.

In describing my present invention it has been necessary, as already explained, to illustrate and describe separate inventions and improvements not comprised in the subjects-matter herein claimed, including the following:—

The improved framework, or "take-down" construction which is herein chiefly illustrated by Figs. 1, 2, 3, 4, 4ᵃ, and 12 to 14, is described and claimed in my copending application, Serial No. 323766.

The firing mechanism, including the hammer and trigger and their directly coacting devices, (which are herein chiefly illustrated by Figs. 5, 5ᵃ, 5ᵇ, 5ᶜ, 5ᵈ, 11, 11ᵃ, and 11ᵇ), is described and claimed in my copending application, Serial No. 323765.

The bolt, or breech-closing mechanism, which is herein illustrated by several of the principal views, (and as to detailed construction is further shown in Figs. 6, 6ᵃ, 7, 8, 8ᵃ, 8ᵇ, 9, 10, 11, and 24 to 26), is described and claimed in my copending application, Serial No. 324402.

The magazine mechanism, which is herein shown in part in the principal figures, (and is more fully illustrated as to details and modes of operation in Figs. 23 to 31ᵃ, inclusive), is described and claimed in my copending application, Serial No. 324401.

Having thus described my invention, I claim:

1. In a firearm comprising a receiver having therein a mechanism chamber provided on one side thereof with an ejection opening, the combination with the receiver, of a barrel and a magazine in position forward of and in communication with the mechanism chamber and arranged with the magazine entrance in a position between the barrel and said ejection opening, and a combined loading, firing and shell-ejector mechanism operably-supported within the mechanism-chamber and comprising a carrier having a working stroke from a cartridge-receiving position between the magazine entrance and the ejection opening, to a shell-receiving position which is on the opposite side of the barrel entrance from the said ejection opening.

2. In a firearm comprising a receiver having therein a mechanism chamber provided on one side thereof with an ejection opening, the combination with the receiver, of a barrel and a magazine in position forward of and in communication with the mechanism chamber and arranged with the magazine entrance on a line between the barrel and said ejection opening, and a combined loading, firing and shell-ejector mechanism operably-supported within the mechanism-chamber and comprising a pair of carrier-arms having a working stroke from a cartridge-receiving position adjacent to the magazine entrance on the side thereof toward the ejection opening, to a shell-receiving position which is on the opposite side of the barrel entrance from the said ejection opening.

3. In a firearm, the combination with a receiver having therein a mechanism chamber provided with a shell-ejection opening in one side thereof, of a barrel and a magazine in position forward of and in communication with said mechanism-chamber and arranged with the magazine entrance adjacent between the barrel and said ejection opening, a carrier operatively supported in the receiver for movements transversely of the barrel and magazine, and carrier-actuating means in position and arranged for operating the carrier to and from three positions, viz, one terminal position for receiving (upon the side thereof toward the barrel) a cartridge from the magazine, a second terminal position for receiving (on the side thereof toward the magazine) a shell from the barrel, and a third and intermediate position for holding a cartridge in loading position.

4. In a firearm, the combination with a receiver having therein a mechanism chamber provided with a shell-ejection opening in one side thereof, of a barrel and a magazine in position forward of and in communication with said mechanism-chamber and arranged with the magazine entrance between the barrel and said ejection opening, a carrier operatively supported in the receiver for movements transversely of the barrel and magazine, and carrier-actuating means in position and arranged for operating the carrier to and from two terminal positions, viz, one terminal position for receiving (upon the side thereof toward the barrel) a cartridge from the magazine and a second terminal position for receiving (on the side thereof toward the magazine) a shell from the barrel, and also arranged for actuating the carrier from said shell-receiving position to said cartridge-receiving position by a one-stage movement, and from said cartridge-receiving position to said shell-receiving position by a two-stage movement.

5. In a firearm, the combination of a receiver having therein a mechanism chamber, a barrel, a magazine adjacent to the barrel, a combined loading and firing mechanism operably-supported in said chamber and retractable through a loading stroke from a firing position, a combined carrier and ejector comprising a pair of cartridge-carrying arms located one at each side of said chamber, and carrier-actuating means appurtenant to said retractable mechanism.

6. In a firearm, the combination of a receiver having therein a mechanism chamber, a barrel, a magazine adjacent to the barrel, a combined loading and firing mechanism operably-supported in said chamber and retractable through a loading-stroke from a firing position, a carrier comprising a pair of reversely facing cartridge-carrying arms pivotally-supported one at each side of said chamber, and carrier-actuating means appurtenant to said retractable mechanism.

7. In a firearm, the combination of a receiver having therein a mechanism chamber, a barrel, a magazine adjacent to the barrel, a combined loading and firing mechanism operably-supported in said chamber and retractable through a loading-stroke from a firing position, a combined carrier and ejector comprising a pair of reversely facing cartridge-carrying arms operably-supported one at each side of said chamber, and means appurtenant to said retractable mechanism and in position and arranged for operating said arms in reverse directions on the reverse movements, respectively, of said mechanism.

8. In a firearm comprising a receiver having therein a mechanism-chamber provided on one side thereof with an ejection opening, the combination with the receiver, of a barrel and a magazine each in position forward of and in communication through an entrance with the mechanism-chamber, and arranged with the magazine entrance between the barrel entrance and the ejection opening, a carrier operably supported for movements transversely of the barrel and to and from a first position at one side of the magazine entrance and adjacent to the ejection opening, and to and from a second-position at the opposite side of the barrel entrance, and a combined loading-in, firing and carrier-actuating mechanism operably-supported in said mechanism-chamber for a retraction stroke from a firing-position, and arranged for actuating on a full retraction thereof the said carrier to said first position, and also arranged for actuating (on a forward stroke thereof to firing position) the said carrier to said second position.

9. In a firearm comprising a receiver having therein a mechanism-chamber provided on one side thereof with an ejection opening, the combination with the receiver, of a barrel and a magazine each in position forward of and in communication through an entrance with the mechanism-chamber, and arranged with the magazine entrance between the barrel entrance and the ejection opening, a carrier pivotally-supported for movements transversely of the barrel and to and from a first position at one side of the magazine entrance and adjacent to the ejection opening, and to and from a second-position at the opposite side of the barrel entrance, and a carrier-actuating mechanism operably-supported in said mechanism-chamber for reciprocation to and from a firing-position, and arranged for actuating (on one movement thereof) the said carrier to said first position, and also for actuating (on a further movement thereof) the said carrier to said second position.

10. In a firearm comprising a receiver having therein a mechanism-chamber provided on one side thereof with an ejection opening, the combination with the receiver, of a barrel and a magazine each in position forward of and in communication through an entrance with the mechanism-chamber, and arranged with the magazine entrance between the barrel entrance and the ejection opening, a carrier comprising a pair of arms pivotally supported for movements transversely of the barrel and to and from a first position at one side of the magazine entrance and adjacent to the ejection opening, and to and from a second-position at the opposite side of the barrel entrance, and a combined loading-in and carrier-actuating mechanism operably-supported in said mechanism-chamber for reciprocation to and from a firing-position, and arranged for actuating on a full retraction thereof the said pair of carrier-arms to said first position, and also arranged for actuating (on a further movement thereof) the said carrier-arms to said second position.

11. In a firearm comprising a receiver having therein a mechanism-chamber provided on one side thereof with an ejection opening, the combination with the receiver, of a barrel and a magazine each in position forward of and in communication through an entrance with the mechanism-chamber, and arranged with the magazine entrance between the barrel entrance and the ejection opening, a carrier operably supported for movements transversely of the barrel and to and from a first position at one side of the magazine entrance and adjacent to the ejection opening, and to and from a second position at the opposite side of the barrel entrance, a combined loading-in, firing and carrier-actuating mechanism operably-supported in said mechanism-chamber for a retraction stroke from a firing position, and arranged for actuating on a full retraction thereof the said carrier to said first position, and also arranged for actuating (on a forward stroke thereof to firing position) the said carrier to said second position, a cartridge detainer operably-supported at said magazine entrance, and detainer-operating means appurtenant to said mechanism and arranged for releasing a cartridge on the actuation of the carrier to said first position.

12. In a firearm comprising a receiver having therein a mechanism-chamber provided on one side thereof with an ejection opening, the combination with the receiver, of a barrel and a magazine each in position forward of and in communication through an entrance with the mechanism-chamber, and arranged with the magazine entrance between the barrel entrance and the ejection opening, a carrier pivotally-supported for movements transversely of the barrel and to and from a first position at one side of the magazine entrance and adjacent to the ejection opening, and to and from a second position at the opposite side of the barrel entrance, a carrier-actuating mechanism operably-supported in said mechanism-chamber for reciprocation to and from a firing position, and arranged for actuating (on one movement thereof) the said carrier to said first position, and also arranged for actuating (on a further movement thereof) the said carrier to said second position, a cartridge detainer operably-supported at said magazine entrance, and detainer-operating means appurtenant to said mechanism and arranged for operating said detainer to release a cartridge on the actuation of the carrier to said first position.

13. In a firearm comprising a receiver having therein a mechanism-chamber provided on one side thereof with an ejection opening, the combination with the receiver, of a barrel and a magazine each in position forward of and in communication through an entrance with the mechanism-chamber, and arranged with the magazine entrance between the barrel entrance and the ejection opening, a carrier comprising a pair of arms pivotally-supported for movements transversely of the barrel and to and from a first position at one side of the magazine entrance and adjacent to the ejection-opening, and to and from a second position at the opposite side of barrel entrance, a combined loading-in and carrier-actuating mechanism operably-supported in said mechanism-chamber for reciprocation to and from a firing position, and arranged for actuating on a full retraction thereof the said pair of carrier arms to said first position, and also arranged for actuating (on a movement thereof to firing position) the said carrier-arms to said second position, a cartridge detainer operably-supported at said magazine entrance, and detainer-operating means appurtenant to said mechanism and arranged for operating said detainer to release a cartridge on the actuation of the carrier-arms to said first position.

14. In a firearm, the combination of a receiver having therein a mechanism chamber, a barrel, a magazine adjacent to the barrel, a combined loading and firing mechanism operably-supported in said chamber and reciprocatable through a loading-stroke forwardly to and rearwardly from a firing position, a carrier comprising a pair of cartridge-carrying arms located one at each side of said chamber and coöperative with the magazine, and carrier-actuating means appurtenant to said reciprocatable mechanism, and in position and arranged for actuating the carrier-arms through a shell-ejecting stroke to a cartridge-receiving position with relation to the magazine during a rearward-stroke of said mechanism, and also comprising means in position and arranged for actuating the carrier-arms to a mid-stroke loading-in position during an early part of a forward stroke of the mechanism.

15. In a firearm, the combination of a receiver having therein a mechanism chamber, a barrel, a magazine adjacent to the barrel, a combined loading and firing mechanism operably-supported in said chamber and reciprocatable through a loading-stroke forwardly to and rearwardly from a firing position, a carrier comprising a pair of reversely facing cartridge-carrying lever-arms pivotally supported one at each side of said chamber, and lever-arm actuating means appurtenant to said reciprocatable mechanism, in position and arranged for actuating said lever-arms to a cartridge-receiving position during a rearward movement of said mechanism, and also comprising means in position and arranged for actuating the lever-arms to a mid-stroke loading-in position during a forward movement of the mechanism.

16. In a firearm, the combination of a receiver having therein a mechanism chamber, a barrel, a magazine adjacent to the barrel, a combined loading and firing mechanism operably-supported in said chamber and reciprocatable through a loading-stroke forwardly to and rearwardly from a firing position, a carrier comprising a pair of cartridge-carrying arms located one at each side of said chamber, and carrier-actuating means appurtenant to said retractable mechanism, and in position and arranged for actuating the carrier-arms through a shell-ejecting stroke to a cartridge-receiving position during a rearward movement of said mechanism, and also comprising means in position and arranged for actuating the carrier-arms, first, to a mid-stroke loading-in position during an early part of a forward movement of the mechanism, and second, to a shell-receiving position with relation to the barrel, during a later part of the same forward movement of said mechanism.

17. In a firearm, the combination of a receiver having therein a mechanism chamber, a barrel, a magazine, a combined loading and firing mechanism operably-supported in said chamber and reciprocatable through a loading-stroke forwardly to and rearwardly from a firing-position, a carrier comprising a pair of cartridge-carrying arms located one at each side of said chamber, and carrier-actuating means appurtenant to said mechanism and comprising means in position and arranged for actuating the carrier-arms through a shell-ejecting stroke to a cartridge-receiving position during a rearward movement of said mechanism, and also comprising means in position and arranged for actuating the carrier-arms to a mid-stroke loading-in position during an early part of a forward stroke of said mechanism, and means coöperative with said mechanism for delivering a cartridge from the magazine into the mechanism chamber on a full retraction of said mechanism and following the actuation of said carrier-arms to said cartridge-receiving position.

18. In a firearm, the combination of a receiver having therein a mechanism chamber, a barrel, a magazine having the entrance thereof adjacent to the barrel, a combined loading and firing mechanism operably-supported in said chamber and reciprocatable through a loading-stroke forwardly to and rearwardly from a firing-position, a carrier comprising a pair of cartridge-carrying arms located one at each side of said chamber, and carrier-actuating means appurtenant to said mechanism and comprising means in position and arranged for actuating the carrier-arms through a shell-ejecting stroke to a cartridge-receiving position during a rearward movement of said mechanism, and also comprising means in position and arranged for actuating the carrier-arms to a mid-stroke loading-in position during an early part of a forward stroke of said mechanism, and means cooperative with said mechanism for delivering a cartridge from the magazine into the mechanism chamber on a full retraction of said mechanism and following the actuation of said carrier-arms to said cartridge-receiving position, a cartridge-detainer operably-supported at the magazine entrance and operable for releasing a cartridge when the carrier-arms are in said cartridge-receiving position thereof, and detainer-locking means appurtenant to said mechanism and in position and arranged for positively locking the detainer on the forward movement of said mechanism.

19. In a firearm, the combination of a receiver having therein a mechanism chamber, a barrel, a magazine having the entrance thereof adjacent to the barrel, a combined loading and firing mechanism operably-supported in said chamber and retractable through a loading-stroke from a firing-position, a carrier comprising a pair of cartridge-carrying arms located one at each side of said chamber, and carrier-actuating means appurtenant to said retractable mechanism and comprising means in position and arranged for actuating the carrier-arms through a shell-ejecting stroke to a cartridge-receiving position during a retraction of said mechanism, means coöperative with said mechanism for delivering a cartridge from the magazine into the mechanism chamber on the full retraction of said mechanism and following the actuation of said carrier-arms to said cartridge-receiving position, a cartridge detainer in position and arranged for releasably holding a cartridge in the magazine, and detainer-locking means appurtenant to said mechanism and in position and arranged for unlocking said detainer on the movement of said carrier-arms into their said cartridge-receiving position.

20. In a firearm, the combination with a receiver, of a barrel, a magazine adjacent to the barrel, a carrier operably-supported within the receiver for a movement from a cartridge-receiving position at one side of the magazine to a shell-receiving position at the opposite side of the barrel, and a combined loading and shell-extracting mechanism operably-supported within the receiver for a loading stroke forwardly to and a retraction stroke rearwardly from a firing position, and comprising carrier-actuating means in position and arranged for actuating the carrier during an early part of said loading stroke away from said cartridge-receiving position toward said shell-receiving position.

21. In a firearm, the combination with a receiver, of a barrel, a magazine adjacent to the barrel, a carrier operably-supported within the receiver for a movement from a cartridge-receiving position at one side of the magazine to a shell-receiving position at the opposite side of the barrel, and a combined loading and shell-extracting mechanism operably-supported within the receiver for a loading stroke forwardly to and a retraction stroke rearwardly from a firing position, and comprising a pair of actuator-faces in position and arranged one of them for actuating the carrier from said cartridge-receiving position toward said shell-receiving position during an early part of said loading-stroke, and another of them for actuating the carrier into said cartridge-receiving position during a later part of said retraction-stroke.

22. In a firearm, the combination with a receiver, of a barrel, a magazine adjacent to the barrel, a carrier operably-supported within the receiver for a movement from a cartridge-receiving position at one side of the magazine to a shell-receiving position at the opposite side of the barrel, and a combined loading and shell-extracting mechanism operably-supported within the receiver for a loading stroke forwardly to and a retraction stroke rearwardly from a firing position, and comprising a pair of actuator-faces in position and arranged one of them for actuating the carrier into said shell-receiving position during a part of a loading-stroke, and another of them for actuating the carrier away from said shell-receiving position during a later part of a retraction stroke.

23. In a firearm, the combination with a receiver, of a barrel, a magazine adjacent to the barrel, a carrier operably-supported within the receiver for a movement from a cartridge-receiving position at one side of the magazine to a shell-receiving position at the opposite side of the barrel, and a combined loading, firing and shell-extracting mechanism operably-supported within the receiver for a loading stroke forwardly to and a retraction stroke rearwardly from a firing position, and comprising carrier-actuating means in position and arranged for actuating the carrier during an early part of said loading stroke, from said cartridge-receiving position toward said shell-receiving position, and also comprising means for actuating the carrier to complete the movement thereof to said shell-receiving position during a later portion of said loading-stroke and prior to the firing of the cartridge.

24. In a firearm, the combination with a receiver of a barrel, a magazine adjacent to the barrel, a carrier operably-supported within the receiver for a movement from a cartridge-receiving position at one side of the magazine to a shell-receiving position at the opposite side of the barrel, and a combined loading and shell-extracting mechanism operably-supported within the receiver for a loading stroke forwardly to and a retraction stroke rearwardly from a firing position, and comprising carrier-actuating means in position and arranged for actuating the carrier during an early part of said loading stroke, from said cartridge-receiving position toward said shell-receiving position, and also comprising a forwardly located actuator-face in position and arranged for engaging and actuating the carrier to complete the movement thereof to said shell-receiving position during a later portion of said loading-stroke.

25. In a firearm, the combination with a receiver, of a barrel, a magazine adjacent to the barrel, a carrier operably-supported within the receiver for a movement from a cartridge-receiving position at one side of the magazine to a shell-receiving position at the opposite side of the barrel, and a combined loading and shell-extracting mechanism operably-supported within the receiver for a loading stroke forwardly to and a retraction stroke rearwardly from a firing position, and comprising a plurality of actuator-faces in position and arranged one of them for actuating the carrier away from said cartridge-receiving position toward said shell-receiving position during an early part of said loading stroke, and one of them for actuating the carrier at a later period to complete the movement thereof to said shell-receiving position.

26. In a firearm, the combination with a receiver, of a barrel, a magazine adjacent to the barrel, a carrier operably-supported within the receiver for a movement from a cartridge-receiving position at one side of the magazine to a shell-receiving position at the opposite side of the barrel, and a combined loading, firing and shell-extracting mechanism operably-supported within the receiver for a loading-stroke forwardly to and a retraction stroke rearwardly from a firing position, and comprising carrier-actuating means in position and arranged for actuating the carrier during an early part of said loading-stroke, from said cartridge-receiving position toward said shell-receiving position, and also comprising means for actuating the carrier to complete the movement thereof to said shell-receiving position during a later portion of said loading-stroke and prior to the firing of the cartridge, and also comprising means in position and arranged for holding the carrier in mid-stroke loading position during a mid-portion of the forward stroke of said mechanism.

27. In a firearm, the combination with a receiver, of a barrel and a magazine, a carrier operably-supported within the receiver for a movement from a cartridge-receiving position at one side of the magazine to a shell-receiving position at the opposite side of the barrel, and a combined loading and shell-extracting mechanism operably-supported within the receiver for a loading-stroke forwardly to and a retraction stroke rearwardly from a firing position, and comprising carrier-actuating means in position and arranged for actuating the carrier from said shell-receiving position, and also comprising means in position and arranged for holding the carrier in a mid-stroke loading position during a mid-portion of said forward stroke of said mechanism.

28. In a firearm, the combination with a receiver, of a barrel, a magazine adjacent to the barrel, a carrier operably-supported within the receiver for a movement from a cartridge-receiving position at one side of the magazine to a shell-receiving position at the opposite side of the barrel, and a combined loading and shell-extracting mechanism operably-supported within the receiver for a loading-stroke forwardly to and a retraction stroke rearwardly from a firing position, and comprising carrier-actuating means in position and arranged for actuating the carrier during an early part of said loading-stroke away from said cartridge-receiving position and toward said shell-receiving position, and also comprising means in position and arranged for holding the carrier in a mid-stroke loading position during a mid-portion of said forward stroke of said mechanism.

29. In a firearm, the combination of a receiver, a barrel and a magazine each opening into the receiver, a breech action mechanism having a base-member supported for reciprocation forwardly and rearwardly in the receiver, a carrier movably mounted in the receiver and in a coöperative relation with the magazine and the barrel, and means appurtenant to said base-member and in position and arranged for operating the carrier alternately to a position above the barrel and to a position below the magazine.

30. In a firearm, the combination of a receiver, a barrel and a magazine each opening into the receiver, a breech action mechanism having a base-member supported for reciprocation forwardly and rearwardly in the receiver, a carrier pivotally supported near the rearward end thereof in the receiver and in a coöperative relation with the magazine and the barrel, and means appurtenant to said base-member and in position and arranged for operating the carrier through a two-stage upward-stroke to a shell-receiving position relatively to the barrel.

31. In a firearm, the combination of a receiver, a barrel and a magazine each opening into the receiver, a breech action mechanism having a base-member supported for reciprocation forwardly and rearwardly in the receiver, a carrier pivotally supported near the rearward end thereof in the receiver and in a coöperative relation with the magazine and the barrel, and carrier-actuating faces appurtenant to said base-member and in position and arranged for operating the carrier through a two-stage upward-stroke.

32. In a firearm, the combination of a receiver, a barrel and a magazine each opening into the receiver, a breech action mechanism having a base-member supported for reciprocation forwardly and rearwardly in the receiver, a carrier movably mounted in the receiver and in a coöperative relation with the magazine, and means appurtenant to said base-member and in position and arranged for operating the carrier through a two-stage upward-stroke during a forward movement of the base-member, and through a single-stage downward stroke during a rearward movement of the base member.

33. In a firearm, the combination of a receiver, a barrel and a magazine each opening into the receiver, a breech action mechanism having a base-member supported for reciprocation forwardly and rearwardly in the receiver, a carrier pivotally supported near the rearward end thereof in the receiver and in coöperative relation with the magazine and the barrel, and means appurtenant to said base-member and in position and arranged for operating the carrier through a two-stage upward-stroke during a forward movement of the base-member, and through a single-stage downward stroke during a rearward movement of the base member.

34. In a firearm, the combination of a receiver, a barrel and a magazine each opening into the receiver, a breech action mechanism having a base-member supported for reciprocation forwardly and rearwardly in the receiver, a carrier comprising a pair of lever-arms located one at each side of the receiver and pivotally supported near the rearward end thereof in the receiver and in coöperative relation with the magazine and the barrel, and means appurtenant to said base-member and in position and arranged for operating the carrier through a two-stage upward-stroke to a shell-receiving position above the barrel opening, and through a single-stage shell-ejecting downward stroke during a rearward movement of the base-member.

35. In a firearm having a magazine located below the barrel, the combination with a receiver and with the barrel and the magazine, of a reciprocatable breech action having a base-member provided with a breech-bolt operably-supported thereon for advancing and retracting movements relatively to said base-member, a carrier operably-supported in position and arranged for actuation to three positions of which a first-position is below the magazine for receiving a cartridge, of which a second-position is below the barrel and is a loading position, and of which a third-position is above the barrel for receiving below the carrier, a shell issuing from the barrel; carrier-actuating means appurtenant to the breech action and in position and arranged for actuating the carrier from said third-position to said first-position thereof on the complete retraction of the base-member, and from said first-position to said second-position on the initial forward movement of the slide-block, and from said second-position to said third-position on the final forward movement of the base-member to firing position; breech-bolt operating means in position and arranged for retracting the breech-bolt relatively to the base-member during said final forward movement of the base-member and during the actuation of the carrier from said second-position to said third-position thereof.

36. In a fire-arm having a magazine located below the barrel, the combination with a receiver and with the barrel and the magazine, of a reciprocatable breech action having a base-member provided with a breech-bolt operably-supported thereon for advancing and retracting movements relatively to said base-member, and rotatable into and out of locking engagement with the receiver; breech action-operating means in position and arranged for reciprocating the breech action from a retracted and loading position forwardly to a firing-position; a carrier operably-supported in position and arranged for actuation to three positions of which a first-position is below the magazine for receiving a cartridge, of which a second-position is below the barrel and is a loading position, and of which a third-position is above the barrel for receiving below the carrier, a shell issuing from the barrel; carrier-actuating means appurtenant to the breech action and in position and arranged for actutating the carrier from said third-position to said first-position thereof on the complete retraction of the breech action, and from said first-position to said second-position on the initial forward movement of the base-member, and from said second-position to said third-position on the final forward movement of the base-member to firing position; breech-bolt operating means in position and arranged for retracting the breech-bolt relatively to the base-member of the breech action and during said final forward movement of the base-member and during the actuation of the carrier from said second-position to said third position thereof and for rotating the breech-bolt into locking engagement with the receiver during the said actuation of the carrier to the said third-position thereof.

37. In a firearm, the combination with a receiver, a barrel and a magazine, of a reciprocatable breech action having carrier-actuating means, and a carrier arranged for operation by the breech action and comprising a pair of oppositely-facing carrier-arms each having longitudinally thereof a pair of guide-faces located in position for a lower one of them to engage above and for an upper one of them to engage below a cartridge-shell, and also having a transverse rim-channel.

38. In a firearm, the combination with a receiver, a barrel and a magazine, of a reciprocatable breech action having carrier-actuating means, and a carrier arranged for operation by the breech action and comprising a forwardly-extending carrier-arm having longitudinally thereof a pair of guide-faces located in position for a lower one of them to engage above and for an upper one of them to engage below a cartridge-shell, and also having a transverse rim-channel intersecting said longitudinal guide-faces.

39. In a firearm, the combination with a receiver, a barrel and a magazine, of a reciprocatable breech action having carrier-actuating means, and a carrier arranged for operation by the breech action and comprising a pair of oppositely-facing carrier-arms each having longitudinally thereof a pair of guide-faces located in position for a lower one of them to engage above and for an upper one of them to engage below a cartridge-shell, and also having a transverse rim-channel intersecting said longitudinal guide-faces and in position for permitting the passage of a shell-rim when inserting a cartridge by hand, said rim-channel being located in an upwardly and rearwardly inclined position.

40. In a firearm, the combination with a receiver, a barrel and a magazine, of a reciprocatable shell-extracting breech action having carrier-actuating means, and a carrier coöperative with and arranged for operation by the breech action and comprising a pair of oppositely-facing carrier-arms each having longitudinally thereof a guide-face located in position for engaging above a cartridge-shell issuing from the barrel and also having a stop-face in position for deflecting a shell when this is withdrawn from the barrel.

41. In a firearm, the combination of a receiver, barrel, a magazine, a breech action comprising a reciprocatable base-member, a carrier in position and arranged for working-strokes to and from a lower position below and to and from an upper position above a cartridge-shell issuing from the barrel; and carrier-actuating means consisting of a series of three coacting cam-pairs comprising six actuation faces arranged three of them on the carrier and three on the base-member, said cam-pairs being also in position and arranged, two of them for effecting two successive upward movements of the carrier, and one of them for effecting a one-stage downward stroke of the carrier during the rearward stroke of the base-member and subsequent to the withdrawal of a shell from the barrel-chamber.

42. In a firearm, the combination of a receiver, a barrel, a magazine, a reciprocatable breech action, a carrier in position and arranged for working-strokes to and from a lower position below a cartridge issuing from the magazine and to and from an upper position above a cartridge-shell issuing from the barrel; and carrier-actuating means consisting of a series of coacting cam-pairs comprising six actuation faces arranged three of them on the carrier and three on the breech-action, said cam-pairs being also in position and arranged two of them for effecting successive upward movements of the carrier, and one of them for effecting a downward stroke of the carrier during the rearward stroke of the breech action and subsequent to the withdrawal of a shell from the barrel-chamber, and said cam-pair for effecting the second said upward movement comprising a forwardly-facing convex actuator-face on the breech action and a concave coacting face of a larger curvature on the carrier, and arranged for thereby imparting to the carrier an accelerated upward movement relatively to the forward movement of the breech action.

43. In a firearm mechanism, the combination of a frame, a barrel, a magazine, a reciprocating breech-bolt, an extractor having the hook thereof located at the underside of the forward end of the breech-bolt, a carrier operable transversely of the breech-bolt, and having arms located one on either side of the breech-bolt and having shell-guiding faces coöperative with the extractor hook, carrier-actuating means for operating said carrier-arm faces to a position above a cartridge-shell prior to the extraction of a shell from the barrel, means for retracting the breech-bolt and extractor hook and thereby extract a shell from the barrel and draw the shell under the carrier-arms, and means for actuating the carrier-arms toward a shell-receiving position relatively to the magazine on the withdrawal of a shell from the barrel.

44. In a firearm mechanism, the combination of a frame, a barrel, a magazine, reciprocating breech-bolt, an extractor having the hook thereof located at the underside of the forward end of the breech-bolt, a carrier pivotally supported near the rearward end thereof, and having arms located one on either side of the breech-bolt and having a shell-engaging face on the lower side of each of said arms, carrier-actuating means arranged for operating said carrier-arm faces to an elevated position above a cartridge-shell and lower than the top of the shell prior to the extraction of the shell from the barrel, means for retracting the breech-bolt and extractor hook and thereby extract the shell from the barrel and draw the shell under the carrier-arms while these arms are in said elevated position, and means for actuating the carrier-arms toward a shell-receiving position relatively to the magazine on the withdrawal of a shell from the barrel.

45. In a firearm mechanism, the combination of a frame, a barrel, a reciprocating breech-bolt, an extractor having the hook thereof located at the underside of the forward end of the breech-bolt, a carrier operably supported for movements transversely of the breech-bolt and having a shell-guiding face coöperative with the extractor hook, carrier-actuating means arranged for operating said carrier to locate said carrier face above the extraction position of the cartridge-shell prior to the extraction of a shell from the barrel, means for retracting the breech-bolt and extractor hook and thereby extract the shell from the barrel and draw the shell under the carrier face, and means for actuating the carrier.

46. In a magazine firearm, the combination of a frame having therein a mechanism chamber with a bottom-ejection opening, a barrel, a magazine having the outlet thereof located for delivering a cartridge into said frame chamber at a position between the ejection-opening and the barrel, a carrier operably-supported in the frame for movements to and from a cartridge-receiving position between the magazine and the ejection-opening, and to and from a shell-receiving position on the opposite side of the barrel from the magazine, a reciprocatable breech action having carrier-actuating means arranged for operating the carrier alternately to each of the said positions thereof, a cartridge-detaining stop device in position at the magazine outlet, means appurtenant to the breech action and arranged for operating said stop-device at a time when the carrier is in said shell-receiving position thereof, a cartridge-releasing device coöperative with said stop-device and actuatable by means not appurtenant to the breech action, and means appurtenant to the breech action and arranged for permitting the cartridge-releasing operation of the cartridge-releasing device at a time when the breech action is retracted and the carrier is in said cartridge-receiving position thereof.

47. In a magazine firearm, the combination of a frame having therein a mechanism chamber with a bottom-ejection opening, a barrel, a magazine having the outlet thereof located for delivering a cartridge into said frame chamber at a position between the ejection-opening and the barrel, an oscillatable carrier supported rearwardly in the frame for movements of the forward end thereof to and from a cartridge-receiving position between the magazine and the ejection-opening, and to and from a shell-receiving position on the opposite side of the barrel from the magazine, a reciprocatable breech action having carrier-actuating means arranged for operating the carrier alternately to each of the said positions thereof, a cartridge-detaining stop device in position at the magazine outlet, means appurtenant to the breech action and arranged for operating said stop-device at a time when the carrier is in said shell-receiving position thereof, a cartridge-releasing device coöperative with said stop-device and actuatable by means not appurtenant to the breech action, and means appurtenant to the breech action and arranged for permitting the cartridge-releasing operation of the cartridge-releasing device at a time when the breech action is retracted and the carrier is in said cartridge-receiving position thereof.

48. In a magazine firearm, the combination of a frame having therein a mechanism chamber with a bottom-ejection opening, a barrel, a magazine having the outlet thereof located for delivering a cartridge into said frame chamber at a position between the ejection-opening and the barrel, an oscillatable carrier supported rearwardly in the frame for movements of the forward end thereof to and from a cartridge-receiving position between the magazine and the ejection-opening, and to and from a shell-receiving position on the opposite side of the barrel from the magazine, a reciprocatable breech action having carrier-actuating means arranged for operating the carrier alternately to each of the said positions thereof, cartridge-detaining means comprising a stop device and a cartridge-shifting releasing device in position at the magazine outlet, and means appurtenant to the breech action and arranged for operating said stop-device at a time when the carrier is in said shell-receiving position thereof, and also arranged for permitting a cartridge-shifting operation of the cartridge-releasing device at a time when the breech action is retracted and the carrier is in said cartridge-receiving position thereof.

49. In a magazine firearm, the combination of a frame having therein a mechanism chamber with a bottom-ejection opening, a barrel, a magazine having the outlet thereof located for delivering a cartridge into said frame chamber at a position between the ejection-opening and the barrel, a carrier operably-supported in the frame for movements to and from a cartridge-receiving position between the magazine and the ejection-opening, and to and from a shell-receiving position on the opposite side of the barrel from the magazine, a reciprocatable breech action having carrier-actuating means arranged for operating the carrier alternately to each of the said positions thereof, cartridge-detaining means comprising a stop-device and a cartridge-shifting releasing device in position at the magazine outlet, and actuating means appurtenant to the breech action and magazine for operating said cartridge-detaining means and thereby deliver a cartridge from the magazine to the carrier at a time when the breech action is retracted and the carrier is in said cartridge-receiving position thereof.

50. In a firearm, the combination of a frame, a barrel, a carrier operably supported in the frame, a reciprocatable breech action comprising a slide carrying a breech-bolt longitudinally-movable thereon, an action-bar extending forwardly from the slide, a magazine mechanism comprising a cartridge-detaining stop device and also comprising a combined cartridge-releaser and slide-lock and an actuator spring therefor, means appurtenant to the slide for actuating the carrier to a cartridge-receiving position below the magazine on the retraction of the slide to a rearward position, and means appurtenant to the action-bar and arranged for permitting the operation of said cartridge-releaser by the actuator-spring thereof at a time when the carrier is in said cartridge-receiving position.

51. In a firearm, the combination of a frame, a barrel, a two-arm carrier pivotally supported near the rearward end thereof in the frame, a reciprocatable breech action comprising a slide carrying a breech-bolt longitudinally-movable thereon, an action-bar extending forwardly from the slide, a magazine mechanism comprising a cartridge-detaining stop device and also comprising a combined cartridge-releaser and slide-lock and an actuator spring therefor, means appurtenant to the slide for actuating the carrier to a cartridge-receiving position below the magazine on the retraction of the slide to a rearward position, means appurtenant to the action-bar and arranged for permitting the operation of the cartridge-releaser by the actuator-spring thereof and thereby lock the breech action in retracted position at a time when the carrier is in said cartridge-receiving position.

52. In a firearm, the combination of a frame, a barrel, a carrier operably-supported in the frame, a reciprocatable breech action comprising a breech-bolt longitudinally-movable thereon, an action-bar extending forwardly from the breech action, a magazine mechanism comprising a cartridge-detaining stop device and also comprising a combined cartridge-releaser and slide-lock and actuating means therefor, carrier-actuating means appurtenant to the breech action for operating the carrier to a cartridge-receiving position below the magazine on the retraction of the breech action to a rearward position, means appurtenant to the action-bar and arranged for permitting the operation of the cartridge-releaser by the actuating means thereof at a time when the carrier is in said cartridge-receiving position, and carrier-actuating means appurtenant to the breech action and arranged for operating the carrier to a shell-receiving position above the barrel after the breech-bolt has reached forward position and before the termination of the forward stroke of the breech action.

53. In a firearm, the combination of a frame, a barrel, a carrier operably-supported in the frame, a reciprocatable breech action comprising a slide carrying a breech-bolt longitudinally-movable thereon, an action-bar extending forwardly from the slide, a magazine mechanism comprising a combined cartridge-releaser and slide-lock and actuating means therefor, means appurtenant to the slide for actuating the carrier to a cartridge-receiving position below the magazine on the retraction of the slide to a rearward position, means appurtenant to the action-bar and arranged for permitting the operation of said cartridge-releaser by the actuating means thereof at a time when the carrier is in said cartridge-receiving position, and means appurtenant to the slide and arranged for actuating the carrier to a shell-receiving position above the barrel after the breech-bolt has reached forward position and before the termination of the forward stroke of the slide.

54. In a firearm, the combination of a frame, a barrel, a carrier pivotally-supported near the rearward end thereof in the frame, a reciprocatable breech action comprising a slide carrying a breech-bolt longitudinally-movable thereon, an action-bar extending forwardly from the slide, a magazine mechanism comprising a cartridge-actuatable combined cartridge-releaser and slide-lock and an actuator spring therefor, means appurtenant to the slide for actuating the carrier to a cartridge-receiving position below the magazine on the retraction of the slide to a rearward position, means appurtenant to the action-bar and arranged for permitting the operation of the cartridge-releaser by the actuator-spring thereof at a time when the carrier is in said cartridge-receiving position, and means appurtenant to the slide and arranged for actuating the carrier to a shell-receiving position above the barrel after the breech-bolt has reached forward position and before the termination of the forward stroke of the slide.

55. In a bottom-ejection magazine firearm, the combination of a receiver, a barrel, a magazine, a breech action reciprocatable in the receiver, a carrier having forwardly-extending arms at the sides of the receiver, means for withdrawing a shell from the barrel with its upper side in engagement with the carrier, and means for moving the carrier downwardly through a shell-ejecting stroke to a cartridge-receiving position relatively to the magazine.

56. In a bottom-ejection firearm, the combination of a receiver, a barrel, a magazine, a reciprocatable breech-action, a carrier pivoted near the rear end thereof in the receiver and having a forwardly-extending cartridge-engaging arm at the side thereof, an extractor carrier by the breech-action in position for engaging and withdrawing a shell from the barrel, carrier-actuating means appurtenant to the breech-action and arranged for elevating the forward end of the carrier-arm to shell-receiving position prior to the withdrawal of a shell out of the barrel and to a position under said elevated carrier-arm, said actuating means being also arranged for depressing the carrier-arm (immediately following the extracting of a shell) to a cartridge-receiving position relatively to the magazine.

57. In a bottom-ejection firearm, the combination of a receiver, a barrel, a magazine, a reciprocatable breech action, a carrier pivoted near the rear end thereof in the receiver and having forwardly-extending cartridge-engaging arms at the sides thereof, a shell-guiding surface in the receiver rearward of the barrel, and located above the extraction position of a shell, an extractor carried by the breech action in position for engaging and withdrawing a shell from the barrel, carrier-actuating means appurtenant to the breech action and arranged for elevating the forward ends of the carrier-arms to shell-receiving position prior to the withdrawal of a shell out of the barrel and to a position under said arms and said guiding surface, said actuating means being also arranged for depressing the carrier-arms, (immediately following the extracting of a shell), to a cartridge-receiving position relatively to the magazine.

58. In a bottom-ejection firearm, the combination of a receiver, a barrel, a magazine, a reciprocatable breech action, a carrier operably supported in the receiver and having forwardly - extending cartridge - engaging arms at the sides thereof, a shell-guiding surface in the receiver rearward of the barrel, and located above the extraction position of a shell, an extractor carried by the breech action and located below the head of a shell while this is being extracted from the barrel and is being guided by said shell-guiding surface of the receiver, carrier-actuating means appurtenant to the breech action and arranged for elevating the forward ends of the carrier-arms to a shell-receiving position relatively to the barrel prior to the withdrawal of a shell out of the barrel and to an ejection-position under said elevated arms, said actuating means being also arranged for depressing the carrier-arms to a cartridge-receiving position relatively to the magazine immediately following the extracting of a shell from the barrel.

59. In a firearm, the combination of a frame, a barrel, a tubular magazine, a carrier coöperative with the magazine and the barrel, a cartridge-stop at the outlet end of the magazine, a reciprocatable breech action having an action-bar provided with a forwardly-facing lock face and also having carrier-actuating means arranged for operating the carrier to a cartridge-receiving position relatively to the magazine and during the retraction of the breech action, and a combined cartridge-releaser and action-bar locker having a first face in position for engaging said lock-face of the action-bar when the breech action is in retracted position, and having a second face in position for engaging a cartridge at the magazine outlet and arranged for shifting the cartridge out of engagement with said cartridge-stop simultaneously with the locking engagement of said first face with said lock-face of the action bar.

60. In a firearm, the combination of a frame, a barrel, a magazine, a carrier coöperative with the magazine and the barrel, a cartridge-stop at the outlet end of the magazine, a reciprocatable breech action provided with a forwardly-facing lock face and also having carrier-actuating means arranged for operating the carrier to a cartridge-receiving position relatively to the magazine and during the retraction of breech action, and a combined cartridge-releaser and breech action locker having a first face in position for engaging forwardly of said lock-face of the breech action when the breech action is in retracted position, and having a second face in position and arranged for engaging and releasing the cartridge at the magazine outlet simultaneously with a movement of said first face into the path of movement of said lock-face of the breech action.

61. In a firearm, the combination of a frame, a barrel, a magazine, a carrier coöperative with the magazine and the barrel, a reciprocatable breech action provided with a forwardly-facing lock face and also having carrier-actuating means arranged for operating the carrier to a cartridge-receiving position relatively to the magazine and during the retraction of breech action, and cartridge-stopping and releasing means comprising a breech action locker having a first face in position for engaging forwardly of said lock-face of the breech action when the breech action is in retracted position, and having a second face in position for engaging and releasing a cartridge simultaneously with the locking engagement of said first face forwardly of said lock-face of the breech action.

62. In a firearm, the combination of a frame, a barrel, a magazine, a carrier cooperative with the magazine and the barrel, a reciprocatable breech action provided with a forwardly-facing lock face and also having carrier-actuating means arranged for operating the carrier to a cartridge-receiving position relatively to the magazine and during the retraction of breech action, and cartridge-stopping and releasing means comprising a breech action locker having a first face in position for engaging forwardly of said lock-face of the breech action when the breech action is in retracted position, and also cartridge-actuatable for releasing the breech action.

63. In a firearm, the combination of a frame, a barrel, a magazine, a carrier cooperative with the magazine and the barrel, a reciprocatable breech action provided with a forwardly-facing lock face and also having carrier-actuating means arranged for operating the carrier to a cartridge-receiving position relatively to the magazine and during the retraction of breech action, and cartridge-stopping and releasing means comprising a cartridge-stop arranged for a swinging movement upon an axis transverse to the magazine, and also comprising a combined cartridge-releaser and breech action locker operably-supported in position and arranged for engaging forwardly of said breech action lock-face on the actuation of the carrier to said cartridge-receiving position thereof.

64. In a firearm, the combination of a frame, a barrel, a magazine, a carrier cooperative with the magazine and the barrel, a reciprocatable breech action provided with a forwardly-facing lock-face and also having carrier-actuating means arranged for operating the carrier to a cartridge-receiving position relatively to the magazine and during the retraction of breech action, and cartridge-stopping and releasing means comprising a cartridge-stop arranged for a swinging movement upon an axis transverse to the magazine, and also comprising a combined cartridge-releaser and breech action locker in position and arranged for engaging forwardly of said breech action lock-face on the actuation of the carrier to said cartridge - receiving position thereof, said combined cartridge-releaser and breech action locker being oscillatable upon an axis which is located longitudinally of the magazine, and also being cartridge-actuatable for unlocking the breech action and thereby permit the actuation upwardly of the carrier by the breech action.

65. In a firearm, the combination of a frame, a barrel, a tubular magazine having the outlet end thereof adjacent to the rearward end of the barrel, a carrier cooperative with the magazine and the barrel, a cartridge-stop at the outlet end of the magazine, a reciprocatable breech action having appurtenant thereto a forwardly - facing lock-face and also having carrier-actuating means arranged for operating the carrier to a cartridge-receiving position relative to the magazine and during the retraction of the breech action, and a combined cartridge-releaser and breech action locker which is cooperative through an intervening cartridge with said cartridge-stop and is actuatable for unlocking the retracted breech action by a cartridge moving rearwardly in the magazine.

66. In a firearm, the combination of a frame, a barrel, a tubular magazine having the outlet end thereof adjacent to the rearward end of the barrel, a carrier cooperative with the magazine and the barrel, a cartridge-stop at the outlet end of the magazine, a reciprocatable breech action having appurtenant thereto a forwardly - facing lock-face and also having carrier-actuating means arranged for operating the carrier to a cartridge-receiving position relatively to the magazine and during the retraction of breech action, and a combined cartridge-releaser and breech-action locker oscillatable transversely of the magazine and having a first face in position for engaging said lock-face of the breech action when the breech action is in retracted position, and having a second face in position for engaging a cartridge at the magazine outlet and arranged for shifting the cartridge out of engagement with said cartridge-stop simultaneously with the locking engagement of said first face with said lock-face of the breech action.

67. In a firearm, the combination of a frame, a barrel, a magazine, an oscillating carrier cooperative with the magazine and barrel, and arranged for actuation to a cartridge-receiving position, a shell-receiving position and an intermediate loading-in position, a breech action comprising a reciprocatable slide and a breech-bolt carried on the slide and reciprocatable thereon, and carrier-actuating means appurtenant to the breech action and comprising means in position and arranged for actuating the carrier from the cartridge-receiving to the loading-in position thereof during the initial forward stroke of the breech-action and for actuating the carrier from the loading-in to the shell-receiving position thereof during the forward movement of the slide relatively to the breech-bolt.

68. In a firearm, the combination of a frame, a barrel, a magazine, an oscillating carrier coöperative with the magazine and barrel, and arranged for actuation to a cartridge-receiving position, a shell-receiving position and an intermediate loading-in position, a breech action comprising a reciprocatable slide and a breech-bolt carried on the slide and reciprocatable thereon, and carrier-actuating means appurtenant to the breech action and comprising means in position and arranged for actuating the carrier from the cartridge-receiving to the loading-in position thereof during the initial forward stroke of the breech action and for actuating the carrier from the loading-in to the shell-receiving position thereof during the forward movement of the slide relatively to the breech-bolt, and also comprising means for releasing and thereby permitting a short downward movement of the carrier from said loading-in position during the forward stroke of the slide and prior to the breech-bolt reaching its forward position.

69. In a bottom-ejection firearm, the combination with a frame, a barrel and a magazine located below the barrel, of a breech action reciprocatable forwardly and rearwardly in the frame and comprising means for withdrawing a shell from the barrel during the rearward movement of the breech action, a shell-ejector member operably-supported in the frame, actuating means appurtenant to the breech action and in position and arranged for operating the shell-ejector member upwardly to a shell-receiving position relatively to the barrel, and actuating means in position and arranged for operating and timing the movements of the shell-ejector member to downwardly turn a withdrawn shell by a swinging movement and toward a vertical position in the frame, and toward a transverse position relatively to the magazine, during an early part of an ejection stroke of said shell-ejector member.

70. In a bottom-ejection firearm, the combination with a frame, a barrel and a magazine located below the barrel, of a breech action reciprocatable forwardly and rearwardly in the frame and comprising means for withdrawing a shell from the barrel during the rearward movement of the breech action, a shell-ejector member pivotally supported rearwardly in the frame, actuating means appurtenant to the breech action and in position and arranged for operating the shell-ejector member upwardly to a shell-receiving position relatively to the barrel, and actuating means in position and arranged for operating and timing the movements of the shell-ejector member to downwardly turn a withdrawn shell by swinging movement toward a vertical position in the frame, and toward a transverse position relatively to the magazine, during an early part of an ejection stroke of said shell-ejector member.

71. In a bottom-ejection firearm, the combination with a frame, a barrel and a magazine located below the barrel, of a breech action reciprocatable forwardly and rearwardly in the frame and comprising means for withdrawing a shell from the barrel during the rearward movement of the breech action, a combined carrier and shell-ejector member operably-supported for upward and downward movements in the frame, actuating means appurtenant to the breech action and in position and arranged for operating the shell-ejector member upwardly to a shell-receiving position relatively to the barrel during a forward movement of the breech action, actuating means in position and arranged for downwardly operating the shell-ejector through an ejection-stroke and timing the ejection-movement thereof to downwardly turn a withdrawn shell by a swinging movement toward a vertical position in the frame and toward a transverse position relatively to the magazine, during a rearward movement of the breech action and during an early part of an ejection stroke of said shell-ejector, and means for continuing the said downward movement of the combined carrier and shell-ejector member to a cartridge-receiving position relatively to the magazine.

72. In a bottom-ejection firearm, the combination with a frame, a barrel and a magazine located below the barrel, of a breech action reciprocatable forwardly and rearwardly in the frame and comprising means for withdrawing a shell from the barrel during the rearward movement of the breech action, a combined carrier and shell-ejector pivotally supported rearwardly in the frame, actuating means appurtenant to the breech action and in position and arranged for swinging the shell-ejector upwardly to a shell-receiving position relatively to the barrel during a forward movement of the breech action, actuating means in position and arranged for downwardly swinging the shell-ejector and timing the ejection-movement thereof to downwardly turn a withdrawn shell by a swinging movement toward a vertical position in the frame and toward a transverse position relatively to the magazine, during a rearward movement of the breech action and during an early part of an ejection stroke of said shell-ejector, and means for continuing the said downward swinging movement of the combined carrier and shell-ejector to a cartridge-receiving position relatively to the magazine.

73. In a firearm, the combination with a frame, of a barrel, a magazine, a carrier pivotally supported rearwardly in the frame for upward and downward swinging movements and coöperative with the barrel and magazine, a breech action reciprocatable forwardly and rearwardly in the frame, means appurtenant to the breech action for swinging the carrier to an uplifted shell-receiving position relatively to the barrel on a forward movement of the breech action, means appurtenant to the breech action for withdrawing a shell from the barrel to a position under the uplifted carrier during a rearward movement of the breech action, and a shell-stop face in position on the carrier for coacting with the shell-withdrawing means to turn the withdrawn shell downwardly by a swinging movement in the direction of the downward swinging movement of the carrier, and thereby eject the shell point-first through the bottom-opening of the receiver.

74. In a firearm, the combination with a frame, of a barrel, a magazine, a carrier pivotally supported rearwardly in the frame for upward and downward swinging movements and coöperative with the barrel and magazine, a breech action reciprocatable forwardly and rearwardly in the frame, means appurtenant to the breech action for swinging the carrier to an uplifted shell-receiving position relatively to the barrel, means including an extractor having a hook in position for withdrawing a shell from the barrel to a position under the uplifted carrier during a rearward movement of the breech action, and a shell-stop face in position on the carrier for coacting with the extractor to turn the withdrawn shell downwardly by a swinging movement in the direction of the downward swinging movement of the carrier, and thereby eject the shell point-first through the bottom-opening of the receiver.

75. In a firearm, the combination with a frame, of a barrel, a magazine, a carrier pivotally supported rearwardly in the frame for upward and downward swinging movements and coöperative with the barrel and magazine, a breech action reciprocatable forwardly and rearwardly in the frame, means appurtenant to the breech action for swinging the carrier to an uplifted shell-receiving position relatively to the barrel, means including an extractor having a hook in position for withdrawing a shell from the barrel to a position under the uplifted carrier during a rearward movement of the breech-action, a shell-stop face in position on the carrier for coacting with the extractor to turn the withdrawn shell downwardly by a swinging movement in the direction of the downward swinging movement of the carrier, and thereby eject the shell point-first through the bottom-opening of the receiver, and carrier-actuating means appurtenant to the breech action and in position and arranged for inaugurating a downward movement of the carrier immediately following a time when the hook of the extractor passes rearwardly of said shell-stop face of the carrier.

76. In a bottom-ejection firearm, the combination with a frame, a barrel, and a magazine located below the barrel, of a breech action reciprocatable forwardly and rearwardly in the frame and provided with an extractor arranged for withdrawing a shell from the barrel during the rearward movement of the breech action, said extractor having a hook located below the withdrawn shell and yieldingly upheld by a resilient means depressible by an ejector-member acting through the head of the withdrawn shell, an ejector-member operably-supported for an ejection stroke downwardly from a shell-receiving position relatively to the barrel, a shell-stop face on the ejector-member in position for engaging a withdrawn shell, and ejector-actuating means appurtenant to the breech action and arranged for inaugurating the ejection stroke of the ejector-member in timing with the withdrawal of a shell and for coacting with the shell-stop face to thereby depress the extractor while swinging downwardly the forward end of the shell.

77. In a bottom-ejection firearm, the combination with a frame, a barrel, and a magazine located below the barrel, of a breech action reciprocatable forwardly and rearwardly in the frame and provided with an extractor arranged for withdrawing a shell from the barrel during the rearward movement of the breech action, said extractor having a hook located below the withdrawn shell and being yieldingly upheld by a spring-arm depressible by an ejector-member acting through the head of the withdrawn shell, an ejector-member operably-supported for an ejection stroke downwardly from a shell-receiving position relatively to the barrel, a shell-stop face on the ejector-member in position for engaging a withdrawn shell, and ejector-actuating means appurtenant to the breech action and arranged for inaugurating the ejection stroke of the ejector-member in timing with the withdrawal of a shell and for coacting with the shell-stop face to thereby depress the extractor-hook and spring-arm while swinging downwardly the forward end of the shell.

78. In a bottom-ejection firearm, the combination with a frame, a barrel and a magazine located below the barrel, of a breech action reciprocatable forwardly and rearwardly in the frame and provided with an extractor arranged for withdrawing a shell from the barrel during the rearward movement of the breech action, said extractor having a hook located below the withdrawn shell and being yieldingly upheld by resilient means, depressible by an ejector-member acting through the head of the withdrawn shell, an ejector-member operably-supported for an ejection stroke downwardly from a shell-receiving position relatively to the barrel, a shell-stop face on the ejector-member in position for engaging a withdrawn shell, and ejector-actuating means appurtenant to the breech action and coöperative with the ejector-member and the shell-stop face to thereby swing downwardly the forward end of the shell.

79. In a bottom-ejection firearm, the combination with a frame, a barrel and a magazine located below the barrel, of a breech action reciprocatable forwardly and rearwardly in the frame and comprising shell-withdrawing means arranged for withdrawing a shell from the barrel during the rearward movement of the breech action, a swinging ejector-member pivotally-supported rearwardly in the frame for an ejection stroke downwardly from a shell-receiving position relatively to the barrel, a shell-stop face in position on the ejector-member for engaging a withdrawn shell, and means appurtenant to the breech action and arranged for inaugurating the ejection stroke of the ejector-member on the withdrawal of a shell from the barrel and for thereby swinging downwardly the forward end of the shell.

80. In a bottom-ejection firearm, the combination with a frame, a barrel and a magazine located below the barrel, of a breech action reciprocatable forwardly and rearwardly in the frame and comprising shell-withdrawing means arranged for withdrawing a shell from the barrel during the rearward movement of the breech action, a swinging ejector-member pivotally-supported rearwardly in the frame for an ejection stroke downwardly from a shell-receiving position relatively to the barrel, a shell-stop face in position on the ejector-member for engaging a withdrawn shell, a spring yieldingly upholding the shell-withdrawing means, and means appurtenant to the breech action and arranged for inaugurating the ejection stroke of the ejector-member in timing with the withdrawal of a shell and for thereby swinging downwardly the forward end of the shell.

81. In a bottom-ejection firearm, the combination with a frame, a barrel and a magazine located below the barrel, of a breech action reciprocatable forwardly and rearwardly in the frame and comprising shell-withdrawing means arranged for withdrawing a shell from the barrel during the rearward movement of the breech action, an ejector-member operably-supported in the frame for an ejection stroke downwardly from a shell-receiving position relatively to the barrel, a shell-stop face in position on the ejector-member for engaging a withdrawn shell, and means appurtenant to the breech action and arranged for actuating the ejector-member downwardly on the withdrawal of a shell and for actuating the ejector-member to said shell-receiving position in advance of said shell-withdrawing operation.

82. In a bottom-ejection firearm, the combination with a frame, a barrel and a magazine located below the barrel, of a breech action reciprocatable forwardly and rearwardly in the frame and comprising shell-withdrawing means arranged for withdrawing a shell from the barrel during the rearward movement of the breech action, an ejector-member operably-supported in the frame for an ejection stroke downwardly from a shell-receiving position relatively to the barrel, a shell-stop face in position on the ejector-member for engaging a withdrawn shell, a spring yieldingly upholding the shell withdrawing means, and means appurtenant to the breech action and arranged for actuating the ejector-member downwardly on the withdrawal of a shell and for actuating the ejector-member to said shell-receiving position in advance of said shell-withdrawing operation.

83. In a bottom-ejection firearm, the combination with a frame, a barrel and a magazine located below the barrel, of a breech-action reciprocatable forwardly and rearwardly in the frame and comprising shell-retracting means arranged for withdrawing a shell from the barrel during the rearward movement of the breech action, an ejector-member operably-supported in the frame for an ejection stroke downwardly from a shell-receiving position relatively to the barrel, means appurtenant to the ejector-member for engaging a withdrawn shell and thereby stopping the retraction thereof before the completion of the rearward movement of the breech action, and means appurtenant to the breech action and arranged for actuating the ejector-member downwardly on the withdrawal of a shell and during a further rearward movement of the breech action.

84. In a bottom-ejection firearm, the combination with a frame, a barrel and a magazine located below the barrel, of a breech action reciprocatable forwardly and rearwardly in the frame and comprising shell-retracting means arranged for withdrawing a shell from the barrel during the rearward movement of the breech action, an ejector-member pivotally supported rearwardly in the frame for an ejection stroke downwardly from a shell-receiving position relatively to the barrel, means appurtenant to the ejector-member for engaging a withdrawn shell and thereby stopping the retraction thereof before the completion of the rearward movement of the breech action, and means appurtenant to the breech action and arranged for actuating the ejector-member downwardly on the withdrawal of a shell and during a further rearward movement of the breech action.

85. In a bottom-ejection firearm, the combination with a frame, a barrel and a magazine located below the barrel, of a breech action reciprocatable forwardly and rearwardly in the frame and comprising shell-retracting means arranged for withdrawing a shell from the barrel during the rearward movement of the breech action, an ejector-member operably-supported in the frame for an ejection stroke downwardly from a shell-receiving position relatively to the barrel, means appurtenant to the ejector-member for engaging a withdrawn shell and thereby stopping the retraction thereof before the completion of the rearward movement of the breech action, and means appurtenant to the breech action and arranged for actuating the ejector-member downwardly on the withdrawal of a shell and during a further rearward movement of the breech action, and means in position and arranged for actuating the ejector-member to said shell-receiving position in advance of said shell-withdrawing operation.

86. In a bottom-ejection firearm, the combination with a frame, a barrel and a magazine located below the barrel, of a breech action reciprocatable forwardly and rearwardly in the frame and comprising shell-retracting means arranged for withdrawing a shell from the barrel during the rearward movement of the breech action, an ejector-member pivotally-supported rearwardly in the frame for an ejection stroke downwardly from a shell-receiving position relatively to the barrel, means appurtenant to the ejector-member for engaging a withdrawn shell and thereby stopping the retraction thereof before the completion of the rearward movement of the breech action, and means appurtenant to the breech action and arranged for actuating the ejector-member downwardly on the withdrawal of a shell and during a further rearward movement of the breech action, and means in position and arranged for actuating the ejector-member to said shell-receiving position in advance of said shell-withdrawing operation.

JOHN D. PEDERSEN.

Witnesses:
JOHN E. BRENNAN,
V. A. HAUGHTON.